United States Patent [19]

Sugahara et al.

[11] Patent Number: 5,719,962
[45] Date of Patent: Feb. 17, 1998

[54] METHOD OF AND APPARATUS FOR COMPRESSING IMAGE REPRESENTING SIGNALS

[75] Inventors: Takayuki Sugahara, Kanagawa-ken; Ichiro Ando, Yokohama, both of Japan

[73] Assignee: Victor Company of Japan, Ltd., Yokohama, Japan

[21] Appl. No.: 791,789

[22] Filed: Jan. 29, 1997

Related U.S. Application Data

[62] Division of Ser. No. 468,400, Jun. 6, 1995, Pat. No. 5,644,658, which is a division of Ser. No. 187,459, Jan. 28, 1994, Pat. No. 5,542,008, which is a continuation-in-part of Ser. No. 69,469, Jun. 1, 1993, abandoned, which is a continuation of Ser. No. 650,252, Feb. 4, 1991, abandoned.

[51] Int. Cl.$^6$ .................. G06K 9/36; G06K 9/46
[52] U.S. Cl. ........................... 382/239; 382/261
[58] Field of Search ................... 382/232, 239, 382/240, 250, 260, 261; 348/397, 398, 419, 404, 405

[56] References Cited

U.S. PATENT DOCUMENTS

| | | |
|---|---|---|
| 4,359,736 | 11/1982 | Lewis . |
| 4,510,578 | 4/1985 | Miyaguchi et al. . |
| 4,691,233 | 9/1987 | Acampora . |
| 4,706,260 | 11/1987 | Fedele et al. . |
| 4,731,664 | 3/1988 | Nishiwaki et al. . |
| 4,807,042 | 2/1989 | Tanaka . |
| 4,887,156 | 12/1989 | Ohki . |
| 4,920,414 | 4/1990 | Remus et al. . |
| 4,941,043 | 7/1990 | Jass . |
| 4,985,766 | 1/1991 | Morrison et al. . |
| 5,016,010 | 5/1991 | Sugiyama . |
| 5,051,840 | 9/1991 | Watanabe et al. . |
| 5,101,280 | 3/1992 | Moronaga et al. . |
| 5,109,451 | 4/1992 | Aono et al. . |
| 5,517,581 | 5/1996 | Johnston et al. ............... 382/232 |

FOREIGN PATENT DOCUMENTS

| | | |
|---|---|---|
| 0066697 | 12/1982 | European Pat. Off. . |
| 0138529 | 4/1989 | European Pat. Off. . |
| 61-74455 | 4/1986 | Japan . |
| 2194734 | 8/1990 | Japan . |

OTHER PUBLICATIONS

"A Rate–Adaptive DCT Coding For Use in Solid–State Still Camera" by T. Watanabe et al; Spring Meeting of Japanese Society of Electronics and Information Communications, 1989.

"Activity Detection Method For Solid–State Still Video Camera Using DCT Data Compression" by Y. Takizawa et al; Spring Meeting of Japanese Society of Electronics and Information Communications, 1989.

"Description of Ref. Model 8 (RM8)" pp. 28–30; Document 525, 1989.

"ISO Adaptive Discrete Cosine Transform Coding Scheme For Still Image Telecommunication Services"; Jan. 25, 1988 published by ISO/TC97/SC2/WG8ADCTG.

"Journal of Japanese Society of Electronics and Information Communications", p. 1734; '86/12 vol. J69–B No. 12.

Primary Examiner—Leo Boudreau
Assistant Examiner—Phuoc Tran
Attorney, Agent, or Firm—Lowe, Price, LeBlanc & Becker

[57] ABSTRACT

An image representing input signal is processed so the data therein are filtered in a predetermined manner to derive a filtered signal. The values of the filtered signal are combined at successive time intervals, and the values are combined so there is an addition of a function of values of the filtered signal at the successive time intervals to derive a combined signal. The combined signal is converted into a signal representing a predicted number of bits in a frame of the image. In response to the signal representing a predicted number of bits in a frame of the image, a signal representing the magnitude of a control for quantization step size is derived which is as a function of an error between the predicted number of bits and a predetermined target value therefor. A function of the input signal data is orthogonally transformed so a transformed signal is derived. Output data represented by the transformed signal are quantized so they have quantized step size determined by the control signal representing the magnitude of a quantization step size and there is a reduction in the number of data bits for the image relative to the number of data bits in the input signal.

2 Claims, 14 Drawing Sheets

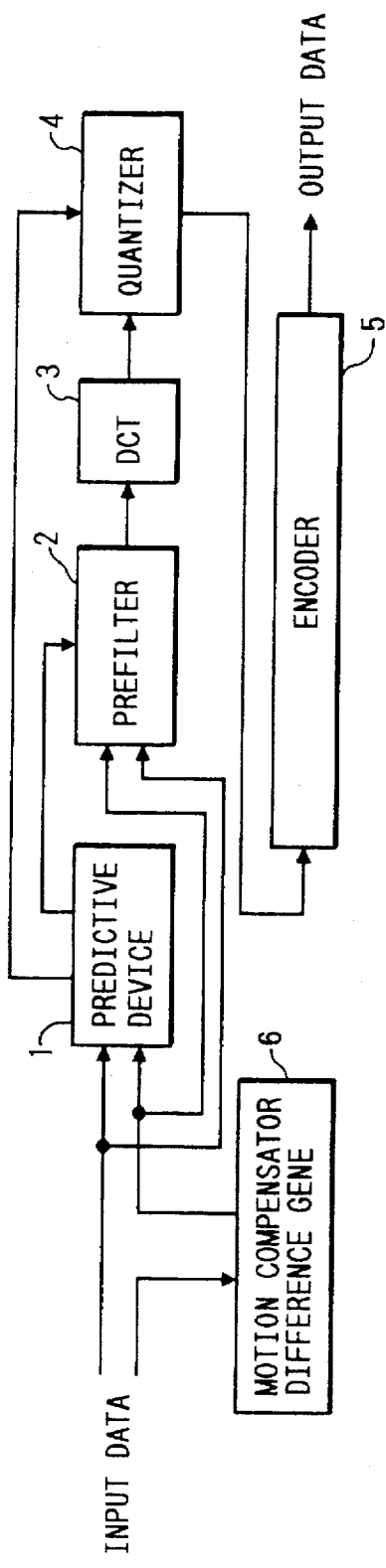
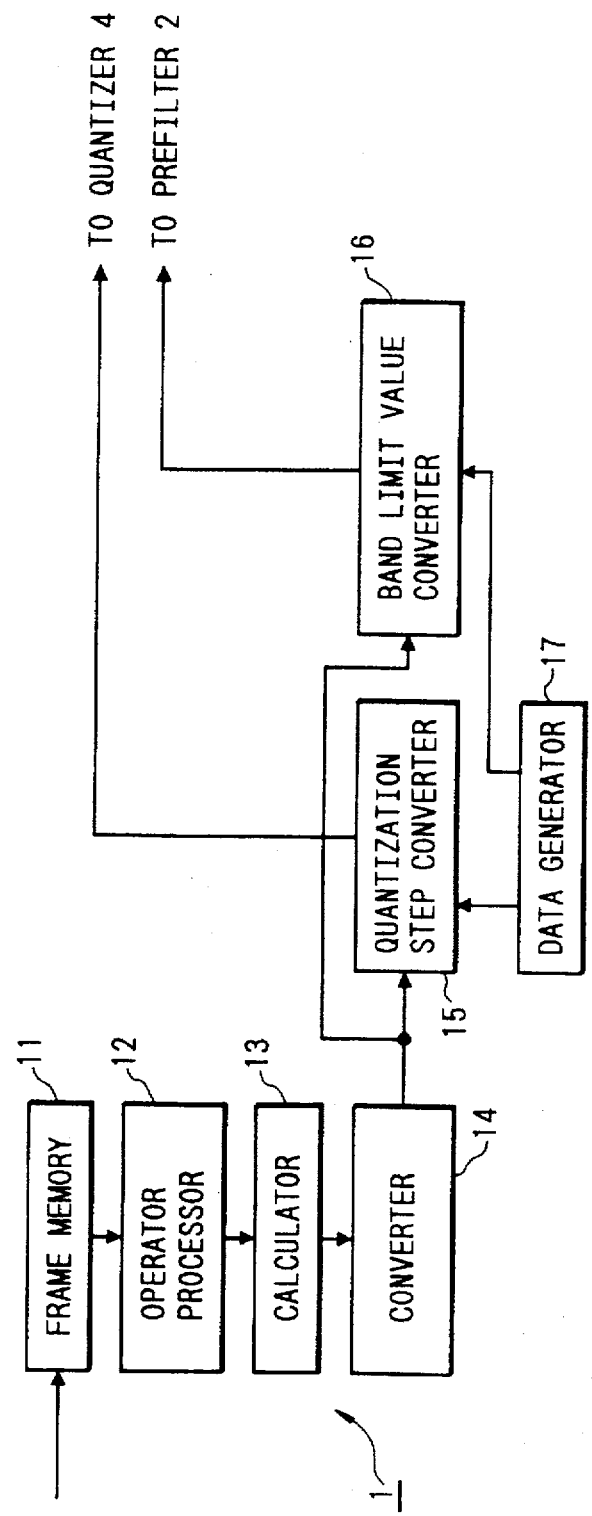

| 1 | -4 | 1 |
|---|----|---|
| -4 | 12 | -4 |
| 1 | -4 | 1 |

| 1 | 2 | 1 |
|---|---|---|
| 2 | 4 | 2 |
| 1 | 2 | 1 |

| -1 | -1 | -1 |
|----|----|----|
| -1 | 8 | -1 |
| -1 | -1 | -1 |

| | | HORIZONTAL BAND LIMIT VALUE | | | | |
| --- | --- | --- | --- | --- | --- | --- |
| | | 0/16 | 1/16 | 2/16 | 3/16 ···· | 16/16 |
| VERTICAL BAND LIMIT VALUE | 0/16 | 0 | 1.5 | 3 | 4.5 | 25 |
| | 1/16 | 1.5 | 3 | 4.5 | ········ 25 | ···· |
| | 2/16 | 3 | 4.5 | ·········· 25 | ········ | |
| | 3/16 | 4.5 | ············ 25 | ············ | | |
| | ⋮ | ············ 25 | ···················· | | | |
| | | ····· 25 | ························ | | | |
| | 16/16 | 25 | ···························· 50 | | | |

CODE-AMOUNT REDUCTION PERCENT

FIG. 20

| IN ADDRESS | OUT DATA BITS |
|---|---|
| 0 | 20K |
| 1 | 20K |
| 2 | 20K |
| 3 | 60K |

FIG. 21

| α (%) | Q STEP |
|---|---|
| -21 | 1 |
| -18 | 2 |
| -15 | 3 |
| -12 | 4 |
| -9 | 5 |
| -6 | 6 |
| -3 | 7 |
| 0 | 8 |
| 3 | 9 |
| 6 | 10 |
| 9 | 11 |
| 12 | 12 |
| 15 | 13 |
| 18 | 14 |
| 21 | 15 |
| 24 | 16 |
| 27 | 17 |
| 30 | 18 |
| 32 | 19 |
| 34 | 20 |
| 36 | 21 |
| 38 | 22 |
| 40 | 23 |
| 42 | 24 |
| 44 | 25 |
| 46 | 26 |
| 48 | 27 |
| 50 | 28 |
| 52 | 29 |
| 54 | 30 |
| 56 | 31 |

FIG. 22

| β (%) | BL VALUE |
|---|---|
| 0 | 0 |
| 3 | 1 |
| 6 | 2 |
| 9 | 3 |
| 12 | 4 |
| 15 | 5 |
| 18 | 6 |
| 21 | 7 |
| 22 | 8 |
| 23 | 9 |
| 24 | 10 |
| 25 | 11 |
| 26 | 12 |
| 27 | 13 |
| 28 | 14 |
| 29 | 15 |
| 30 | 16 |

1

METHOD OF AND APPARATUS FOR COMPRESSING IMAGE REPRESENTING SIGNALS

CROSS-REFERENCES TO RELATED APPLICATIONS

This application is a division of application Ser. No. 08/468,400, filed Jun. 6, 1995, now U.S. Pat. No. 5,644,658, which is a division of application Ser. No. 08/187,459 filed Jan. 28, 1994, now U.S. Pat. No. 5,542,008, which is a continuation-in-part of application Ser. No. 08/069,469 filed Jun. 1, 1993, abandoned, which is a continuation of application Ser. No. 07/650,252 filed Feb. 4, 1991, abandoned.

BACKGROUND OF THE INVENTION

1. Field of the Invention

This invention relates to a method of compressing an image representing signal. This invention also relates to an apparatus for compressing an image representing signal.

2. Description of the Prior Art

An image representing signal is generally shortened to an image signal. Similarly, image representing data is shortened to image data. Compression of a digital image signal or image data means reduction of the total number of bits of the signal or the data. In general, the total number of bits of image data is referred to as an amount of image data.

In some systems for recording image representing data (generally shortened to image data) into a magnetic disk, the image data are compressed to enable efficient recording.

In a known image data compression apparatus, a frame represented by the image data is divided into a plurality of blocks each having N×N or N×M pixels, and the image data are subjected to orthogonal transform for each of the blocks. Then, the resultant image data (transform coefficients) are quantized with a predetermined quantization step size, and the quantization-resultant data are encoded into corresponding words of a zero run length code or a Huffman code. In this way, the image data are compressed. In such data compression, the amount of the image data, that is, the number of bits of the image data or the transmission bit rate of the image data, depends on the contents of the image represented by the image data.

There are two method of controlling the amount of image data (the number of bits of image data) at a constant amount or below a predetermined limit. According to a first method, original image data are quantized with an initial quantization step size and the amount of the quantization-resultant image data is calculated, and the quantization step size is changed to a new quantization step size in response to the calculated image data amount. The original image data are again quantized with the new quantization step size to obtain final quantized image data. The first method requires quantization to be executed twice for same image data.

A second method uses the fact that coefficients of data outputted from an orthogonal transform device have a given relation with the amount of code words (the number of bits of code words). In the second method, the sum of the squares of coefficients is calculated for each of blocks, and the blocks are sorted into classes according to the calculated sums. A larger number of bits are assigned to a block of the class corresponding to a large amount of code words, while a smaller number of bits are assigned to a block of the class corresponding to a small amount of code words. The second method requires the addition of information representing classes.

SUMMARY OF THE INVENTION

It is an object of this invention to provide an improved method of compressing an image representing signal.

It is another object of this invention to provide an improved method of compressing an image representing signal.

A first aspect of this invention provides an apparatus for reducing the number of data bits included in an image representing input signal, comprising means for processing the input signal so the data therein are filtered in a predetermined manner to derive a filtered signal; calculating means responsive to the filtered signal for combining the values of the filtered signal at successive time intervals, the values being combined so there is an addition of a function of values of the filtered signal at the successive time intervals to derive a combined signal; means responsive to the combined signal for converting the combined signal into a signal representing a predicted number of bits in a frame of the image; step-size generating means responsive to the signal representing a predicted number of bits in a frame of the image for deriving a signal representing the magnitude of a control for quantization step size as a function of an error between the predicted number of bits and a predetermined target value therefor; transform means responsive to the input signal for orthogonally transforming a function of the input signal data so a transformed signal is derived; and means responsive to the transformed signal for quantizing output data represented thereby so they have quantized step size determined by the control signal representing the magnitude of a quantization step size and there is a reduction in the number of data bits for the image relative to the number of data bits in the input signal.

A second aspect of this invention provides a data compression apparatus responsive to an image representing input signal, comprising processing means for subjecting data in the input signal to a predetermined filtering process to derive a filtered signal: calculating means responsive to the filtered signal for (a) executing a predetermined calculation on output data included in the filtered signal and (b) deriving a signal representing an activity value of the image from the calculated output data, the predetermined calculation including addition of a function of successive values of the filtered signal; predicted-amount generating means responsive to the signal representing activity value for converting said signal representing activity value derived from the calculating means into a signal representing a prediction of the number of bits in a frame of the image; step-size generating means responsive to the signal representing a predicted number of bits in a frame of the image for deriving a signal representing the magnitude of a control for quantization step size as a function of an error between the predicted number of bits and a predetermined target value therefor: transform means responsive to the input signal for orthogonally transforming a function of the input data so a transformed signal is derived; and means responsive to the transformed signal for quantizing output data represented thereby so they have quantized step size determined by the signal representing the magnitude of a quantization step size and there is a reduction in the number of data bits for the image relative to the number of data bits in the input signal; the predicted-amount generating means deriving the signal representing the predicted number of bits for a frame at time T1 as a function of at least one of (a) the number of bits for a frame at a time prior to T1, (b) an activity value for a time prior to T1, and (c) the actual number of bits for a frame at a time prior to T1.

A third aspect of this invention provides a data compression apparatus responsive to an image representing input signal, comprising processing means for subjecting data in the input signal to a predetermined filtering process to derive a filtered signal; calculating means responsive to the filtered signal for (a) executing a predetermined data compression calculation on output data included in the filtered signal and (b) deriving a signal representing an activity value of the image from the calculated output data, the predetermined calculation including addition of a function of successive values of the filtered signal; predicted-amount generating means responsive to the signal representing activity value for converting said signal representing activity value derived from the calculating means into a signal representing a prediction of the number of bits in a frame of the image; bandwidth control generating means responsive to the signal representing a predicted number of bits in a frame of the image for deriving a signal representing the magnitude of a control for the bandwidth of the input signal as a function of an error between the predicted number of bits and a predetermined target value therefor; and means responsive to the signal representing the magnitude of the control for the bandwidth of the input signal for adjusting the bandwidth of the input signal accordingly; the predicted-amount generating means deriving the signal representing the predicted number of bits for a frame at time T1 as a function of at least one of (a) the number of bits for a frame at a time prior to T1, (b) an activity value for a time prior to T1, and (c) the actual number of bits for a frame at a time prior to T1.

A fourth aspect of this invention provides a method of reducing the number of dat bits included in an image representing input signal, comprising the steps of processing the input signal so the data therein are filtered in a predetermined manner to derive a filtered signal; combining the values of the filtered signal at successive time intervals, the values being combined so there is an addition of a function of values of the filtered signal at the successive time intervals to derive a combined signal; converting the combined signal into a signal representing a predicted number of bits in a frame of the image; responding to the signal representing a predicted number of bits in a frame of the image for deriving a signal representing the magnitude of a control for quantization step size as a function of an error between the predicted number of bits and a predetermined target value therefor; orthogonally transforming a function of the input signal data so a transformed signal is derived; and quantizing output data represented thereby so they have quantized step size determined by the control signal representing the magnitude of a quantization step size and there is a reduction in the number of data bits for the image relative to the number of data bits in the input signal.

A fifth aspect of this invention provides a method of compressing data in an image representing input signal, comprising the steps of subjecting data in the input signal to a predetermined filtering process to derive a filtered signal; executing a predetermined calculation on output data included in the filtered signal, the predetermined calculation including addition of a function of successive values of the filtered signal; deriving a signal representing an activity value of the image from the calculated output data; converting said signal representing activity value derived from the calculating means into a signal representing a prediction of the number of bits in a frame of the image; deriving a signal representing the magnitude of a control for quantization step size as a function of an error between the predicted number of bits and a predetermined target value therefor; orthogonally transforming a function of the input data so a transformed signal is derived; and quantizing output data represented thereby so they have quantized step size determined by the signal representing the magnitude of a quantization step size and there is a reduction in the number of data bits for the image relative to the number of data bits in the input signal; wherein the signal representing the predicted number of bits for a frame at time T1 is derived as a function of at least one of (a) the number of bits for a frame at a time prior to T1, (b) an activity value for a time prior to T1, and (c) the actual number of bits for a frame at a time prior to T1.

A sixth aspect of this invention provides a method of compressing data in an image representing input signal, comprising the steps of subjecting data in the input signal to a predetermined filtering process to derive a filtered signal; executing a predetermined data compression calculation on output data included in the filtered signal, the predetermined calculation including addition of a function of successive values of the filtered signal; deriving a signal representing an activity value of the image from the calculated output data; converting said signal representing activity value derived from the calculating means into a signal representing a prediction of the number of bits in a frame of the image; deriving a signal representing the magnitude of a control for the bandwidth of the input signal as a function of an error between the predicted number of bits and a predetermined target value therefor; and adjusting the bandwidth of the input signal in response to the signal representing the magnitude of the control for the bandwidth of the filtered signal; wherein the signal representing the predicted number of bits for a frame at time T1 is derived as a function of at least one of (a) the number of bits for a frame at a time prior to T1, (b) an activity value for a time prior to T1, and (c) the actual number of bits for a frame at a time prior to T1.

BRIEF DESCRIPTION OF THE DRAWINGS

FIG. 1 is a block diagram of a data compression apparatus according to a first embodiment of this invention.

FIG. 2 is a block diagram of the code-amount predictive device of FIG. 1.

FIG. 17 is a diagram of the relation among a horizontal-direction band limiting value, a vertical-direction band limiting value, and a code-amount reduction rate in the data compression apparatus of FIG. 13.

FIG. 20 is a diagram of the relation between an address and a target code amount in a data generator of FIG. 2.

FIG. 21 is a diagram of the relation between a value "α" and a desired quantization step size in a quantization step converter of FIG. 2.

FIG. 22 is a diagram of the relation between a value "β" and a desired band limiting value in a band limiting value converter of FIG. 2.

DESCRIPTION OF THE FIRST PREFERRED EMBODIMENT

Figures 3A, 3B, 3C, 4:
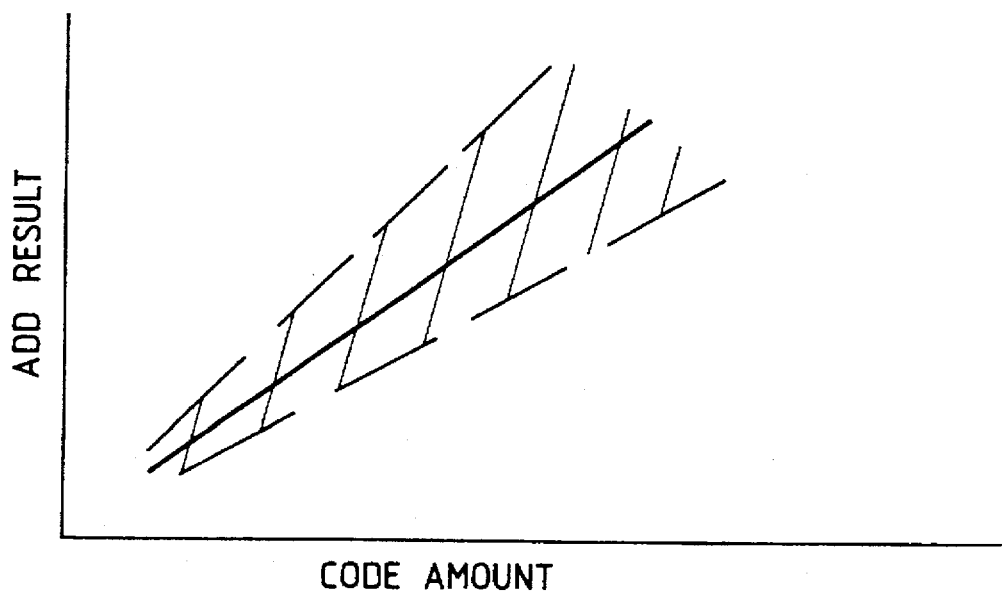
FIG. 3(a) is a diagram of a first matrix of filtering coefficients used in the code-amount predictive device of FIG. 2.
FIG. 3(b) is a diagram of a second matrix of filtering coefficients used in the code-amount predictive device of FIG. 2.
FIG. 3(c) is a diagram of a third matrix of filtering coefficients used in the code-amount predictive device of FIG. 2.
FIG. 4 is a diagram of the relation between an addition result and a code amount in the code-amount predictive device of FIG. 2.
Figure 5A:
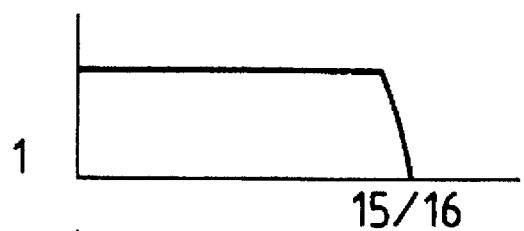
FIG. 5a–5g is a diagram of varying characteristics of the prefilter of FIG. 1.
Figure 5B:
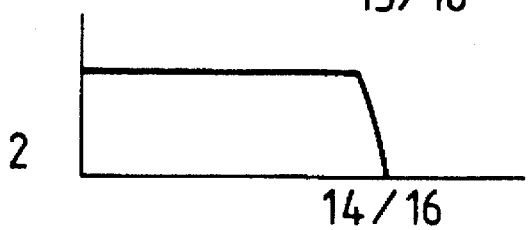
Figure 5C:
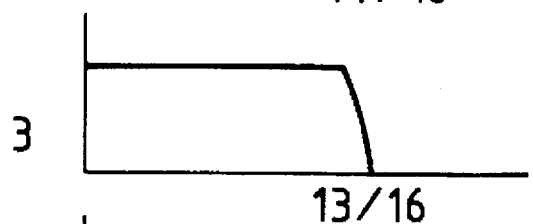
Figure 5D:
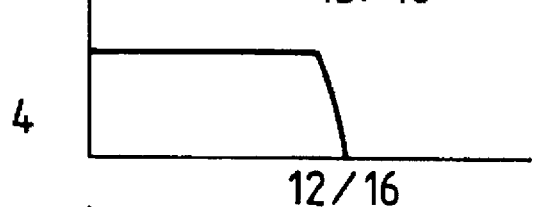
Figure 5E:
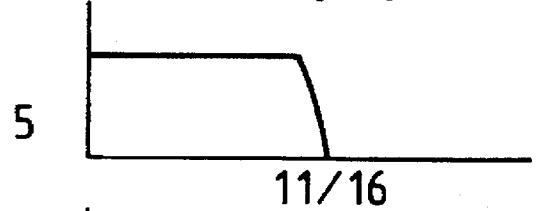
Figure 5F:
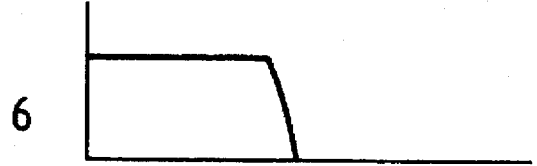
Figure 5G:
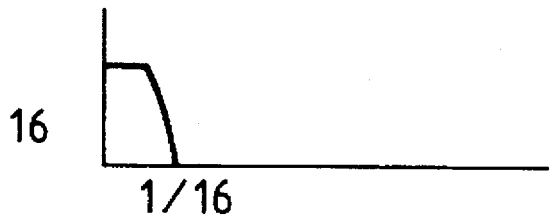

With reference to FIG. 1, input image data are fed to a code-amount predictive device 1 and a prefilter 2 via a device 6 composed of a motion compensator and a difference-data generator (an error-data generator). The input image data may be directly fed to the code-amount predictive device 1 and the prefilter 2. The code-amount predictive device 1 predicts the amount of code words (the number of bits of code words) on the basis of the input image data, and determines a band limiting value and a quantization step size in response to the predicted code amount and outputs data of the determined band limiting value and the determined quantization step size to the prefilter 2 and a quantizer 4 respectively. It should be noted that "band" means "frequency band".

The device 6 subjects the input image data to a motion compensating process, and generates data representative of a difference (an error) between inter-frame predicted image data and reference image data. The difference data are outputted from the device 6 to the code-amount predictive device 1 and the prefilter 2 as image data.

The prefilter 2 limits the band of the image data in response to the band limiting value fed from the code-amount predictive device 1. Output image data from the prefilter 2 are fed to an orthogonal transform device 3 including a discrete cosine transform (DCT) circuit. The image data are subjected to DCT by the DCT circuit 3. Output image data (transform coefficients) from the DCT circuit 3 are fed to the quantizer 4. The quantizer 4 quantizes the image data with the quantization step size fed from the code-amount predictive device 1. Output image data from the quantizer 4 are fed to an encoder 5 and are converted by the encoder 5 into corresponding words of a given-format code such as a zero run length code, a Huffman code, or both the zero run length code and the Huffman code. The output coded data (the output code words) from the encoder 5 are transmitted, or recorded into a recording medium (not shown) via a suitable device (not shown).

As shown in FIG. 2, the code-amount predictive device 1 includes a frame memory 11 into which the input image data are supplied directly or through the device 6 and temporarily stored. The image data are read out from the frame memory 11 and are then fed to an operator processor 12. The image data are subjected to a predetermined filtering process by the operator processor 12. Output image data from the operator processor 12 are fed to a calculator 13. The calculator 13 calculates the absolute values of the image data and sums the absolute values. Output image data from the calculator 13 are fed to a code-amount converter 14. The code-amount converter 14 converts the output image data of the calculator 13 into a predicted code amount (a predicted code-word bit number) which will be obtained at a standard quantization step size and a standard band limiting value. Data representing the predicted code amount are outputted from the code-amount converter 14 to a quantization step converter 15 and a band limiting value converter A data generator 17 outputs data representing a target code amount (a target code-word bit number) The output data from the data generator 17 are fed to the quantization step converter 15 and the band limiting value converter 16. The quantization step converter 15 compares the predicted code amount and the target code amount, and determines a quantization step size in response to the error between the predicted code amount and the target code amount. Data representing the determined quantization step size are outputted from the quantization step converter 15 to the quantizer 4. The band limiting value converter 16 compares the predicted code amount and the target code amount, and determines a band limiting value in response to the error between the predicted code amount and the target code amount. Data representing the determined band limiting value are outputted from the band limiting value converter 16 to the prefilter 2.

The code-amount predictive device 1 will be further described. The input image data corresponding to one frame are temporarily stored into the frame memory 11. The image data are read out from the frame memory 11 and are then fed to the operator processor 12. The image data are subjected to the predetermined filtering process by the operator processor 12.

Specifically, the predetermined filtering process executed by the operator processor 12 is selected from a high-pass filtering process, a low-pass filtering process, and a Laplacian filtering process. The high-pass filtering process, the low-pass filtering process, and the Laplacian filtering process are performed by using matrixes of 3×3 coefficients (coefficients arranged in 3×3) shown in FIG. 3(a), FIG. 3(b), and FIG. 3(c) respectively. During the filtering process executed by the operator processor 12, 3×3 pixel data composing a 3×3 pixel region of one frame are read out from the frame memory 11 and are then multiplied by the 3×3 coefficients respectively, and the 3×3 data which result from the multiplication are summed. As a result, the filtering process is completed for the data composing the 3×3 pixel region. Then, the data reading region is shifted rightward by one pixel for example, and 3×3 pixel data composing the shifted region are read out from the frame memory 11 and are subjected to similar multiplication and summing calculation. As a result, the filtering process is completed for the data composing the subsequent 3×3 pixel region. Such processes are reiterated to complete the filtering processing of all the data corresponding to one frame. It should be noted that the data reading region may be shifted by two pixels, three pixels, or a number of more than three pixels. The operator processor 12 outputs one piece of data representative of the result of summing calculation each time a filtering process for 3×3 pixel data is completed.

The calculator 13 receives the output data from the operator processor 12 which represent the results of summing calculation. The calculator 13 calculates the absolute values of the summing-calculation results, and adds the calculated absolute values corresponding to one frame. As shown in FIG. 4, the result of the addition of the absolute values is approximately proportional to the code amount. Specifically, with respect to a given result of the addition, the amount of codes of the image data lies in the hatched range of FIG. 4.

It should be noted that the calculator 13 may be modified as follows. A first modified calculator 13 calculates the squares of the summing-calculation results, and adds the calculated squares. A second modified calculator 13 calculates the squares of the summing-calculation results, and adds the calculated squares and calculates an average of the result of the addition.

The code-amount converter 14 receives the output data from the calculator 13 which represent the result of the addition executed by the calculator 13. The code-amount converter 14 includes a ROM storing data representative of a predicted code amount which varies as a function of an addition result. Specifically, the predicted code amount is equal to an average value of a code amount. The average value of the code amount is predetermined so as to correspond to the solid line in FIG. 4 which agrees with the center of the hatched range of FIG. 4. The code-amount converter 14 determines a predicted code amount in response to the addition result by referring to the data stored in the ROM. The output data from the code-amount converter 14 which represents the predicted code amount are fed to the quantization step converter 15 and the band limiting value converter 16.

The data generator 17 includes a ROM storing data representing a target code amount. The output data from the data generator 17 which represent the target code amount are fed to the the quantization step converter 15 and the band limiting value converter 16.

Figure 10:
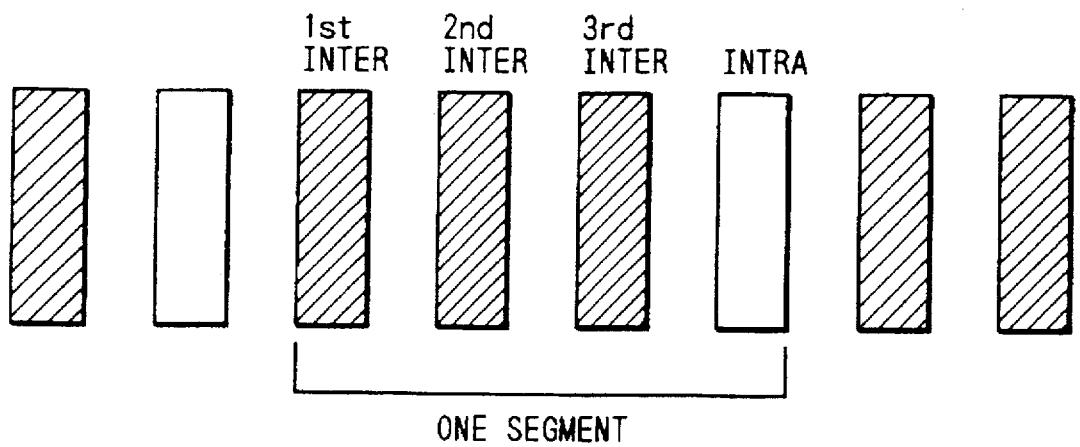
FIG. 10 is a diagram of successive frames in the data compression apparatus of FIG. 8.

The data generator 17 will now be further described. As shown in FIG. 10, four successive frames are grouped into a segment. The first, second, and third frames in a segment are inter-frames while the fourth frame in a segment is an intra-frame. The data generator 17 includes a ROM and an address generator. The address generator receives a frame clock signal having a frequency corresponding to the frame frequency of the input image signal (the input image data). For example, the frame clock signal is generated by a known frame clock signal generator (not shown). The address generator produces an address signal in response to the frame clock signal. The address represented by the address signal is periodically and cyclically changed frame by frame in response to the frame clock signal. Specifically, the address represented by the address signal is "0", "1", and "2" for the first, second, and third inter-frames. The address represented by the address signal is "3" for the intra-frame. The ROM has storage segments which are designated by different addresses respectively. As shown in FIG. 20, the first storage segment of the ROM which is designated by the address "0" stores data representing a predetermined target code amount of 20 Kbits. The second storage segment of the ROM which is designated by the address "1" stores data representing a predetermined target code amount of 20 Kbits. The third storage segment of the ROM which is designated by the address "2" stores data representing a predetermined target code amount of 20 Kbits. The fourth storage segment of the ROM which is designated by the address "3" stores data representing a predetermined target code amount of 60 Kbits. The ROM receives the address signal from the address generator. One of the storage segments of the ROM is accessed in accordance with the address represented by the address signal, and the data representative of the target code amount is outputted from the accessed storage segment of the ROM. For the first, second, and third inter-frames, the address represented by the address signal is "0", "1", and "2" and hence the first, second, and third storage segments of the ROM are accessed so that the ROM outputs the data representing a target code amount of 20 Kbits. For the intra-frame, the address represented by the address signal is "3" and hence the fourth storage segment of the ROM is accessed so that the ROM outputs the data representing a target code amount of 60 Kbits.

The quantization step converter 15 includes a comparator or a subtracter which compares the predicted code amount and the target code amount to calculate the error between the predicted code amount and the target code amount. The quantization step converter 15 also includes a ROM storing data representative of a desired quantization step size which varies as a function of an error between a predicted code amount and a target code amount. The desired quantization step size is chosen so that an actual code amount can be equal to the target code amount. The quantization step converter 15 determines the desired quantization step size in response to the error between the predicted code amount and the target code amount by referring to the data stored in the ROM. The output data from the quantization step converter 15 which represent the desired quantization step size are fed to the quantizer 4.

The quantization step converter 15 will now be further described. The quantization step converter 15 includes a calculator (a subtractor), an address generator, and a ROM. The calculator is informed of the predicted code amount and the target code amount by the code-amount converter 14 and the data generator 17. The calculator determines a value "α" in response to the predicted code amount and the target code amount by referring the equation as follows.

$$\alpha[\%]=(PA-TA)100/PA$$

where PA denotes the predicted code amount and TA denotes the target code amount. The calculator feeds the address generator with data representing the determined value "α". The address generator produces an address signal in response to the output data from the calculator. The address represented by the address signal varies in accordance with the value "α" represented by the output data from the calculator. The ROM has storage segments which are designated by different addresses respectively. As shown in FIG. 21, the storage segments of the ROM store data representing predetermined desired quantization step sizes (Q steps) of "1", "2", ..., "31" respectively. The value "α" and the desired quantization step size are made in a given relation with each other via the address represented by the address signal. The ROM receives the address signal from the address generator. One of the storage segments of the ROM is accessed in accordance with the address represented by the address signal, and the data representative of the desired quantization step size is outputted from the accessed storage segment of the ROM. As a result, the ROM outputs the data of the desired quantization step size which depends on the value "α", that is, which depends on the error between the predicted code amount and the target code amount. For example, the desired quantization step size represented by the output data from the ROM is "1" when the value "β" is equal to or less than "–21", and is "31" when the value "α" is equal to or greater than "56" (see FIG. 21). In addition, for example, the desired quantization step size represented by the output data from the ROM is "14" when the value "α" is in the range of "18" to "20" (see FIG. 21).

The band limiting value converter 16 includes a comparator or a subtracter which compares the predicted code amount and the target code amount to calculate the error between the predicted code amount and the target code amount. The band limiting converter 16 also includes a ROM storing data representative of a desired band limiting value which varies as a function of an error between a predicted code amount and a target code amount. The desired band limiting value is chosen so that an actual code amount can be equal to the target code amount. The band limiting value converter 16 determines the desired band limiting value in response to the error between the predicted code amount and the target code amount by referring to the data stored in the ROM. The output data from the band limiting value converter 16 which represent the desired band limiting value are fed to the prefilter 2.

The band limiting value converter 16 will now be further described. The band limiting value converter 16 includes a calculator (a subtractor), an address generator, and a ROM. The calculator is informed of the predicted code amount and the target code amount by the code-amount converter 14 and the data generator 17. The calculator determines a value "β" in response to the predicted code amount and the target code amount by referring the equation as follows.

$$\beta[\%] = (PA - TA)100/PA$$

where PA denotes the predicted code amount and TA denotes the target code amount. The calculator feeds the address generator with data representing the determined value "β". The address generator produces an address signal in response to the output data from the calculator. The address represented by the address signal varies in accordance with the value "β" represented by the output data from the calculator. The ROM has storage segments which are designated by different addresses respectively. As shown in FIG. 22, the storage segments of the ROM store data representing predetermined desired band limiting values (BL values) of "0", "1", ..., "16" respectively. The value "β" and the desired band limiting value are made in a given relation with each other via the address represented by the address signal. The ROM receives the address signal from the address generator. One of the storage segments of the ROM is accessed in accordance with the address represented by the address signal, and the data representative of the desired band limiting value is outputted from the accessed storage segment of the ROM. As a result, the ROM outputs the data of the desired band limiting value which depends on the value "β", that is, which depends on the error between the predicted code amount and the target code amount. For example, the desired band limiting value represented by the output data from the ROM is "0" when the value "β" is equal to or less than "0", and is "16" when the value "β" is equal to or greater than "30" (see FIG. 22). In addition, for example, the desired band limiting value represented by the output data from the ROM is "4" when the value "β" is in the range of "12" to "14" (see FIG. 22).

The prefilter 2, the DCT circuit 3, the quantizer 4, and the encoder 5 will be further described. The prefilter 2 has a band limiting characteristic variable among 16 different types, some of which are shown in the parts (a)–(g) of FIG. 5. The 16 types are defined by band limiting factors (cut-off frequencies) of 15/16–1/16 with respect to a reference value respectively. The band limiting characteristic of the prefilter 2 is selected from the 16 different types in response to the desired band limiting value fed from the band limiting value converter 16. The input image data are processed by the prefilter 2 with the selected band limiting characteristic. The band-limited output data from the prefilter 2 are fed to the DCT circuit 3.

The DCT circuit 3 separates one-frame output image data from the prefilter 2 into blocks. The image data are subjected by the DCT circuit 3 to DCT for each of the blocks. Output data from the DCT circuit 3 are fed to the quantizer 4. The quantizer 4 quantizes the image data with the quantization step size fed from the code-amount predictive device 1. Output image data from the quantizer 4 are fed to the encoder 5 and are converted by the encoder 5 into corresponding words of a given-format code such as a zero run length code, a Huffman code, or both the zero run length code and the Huffman code. The output coded data (the output code words) from the encoder 5 are transmitted, or recorded into a recording medium (not shown) via a suitable device (not shown).

DESCRIPTION OF THE SECOND PREFERRED EMBODIMENT

Figure 6:
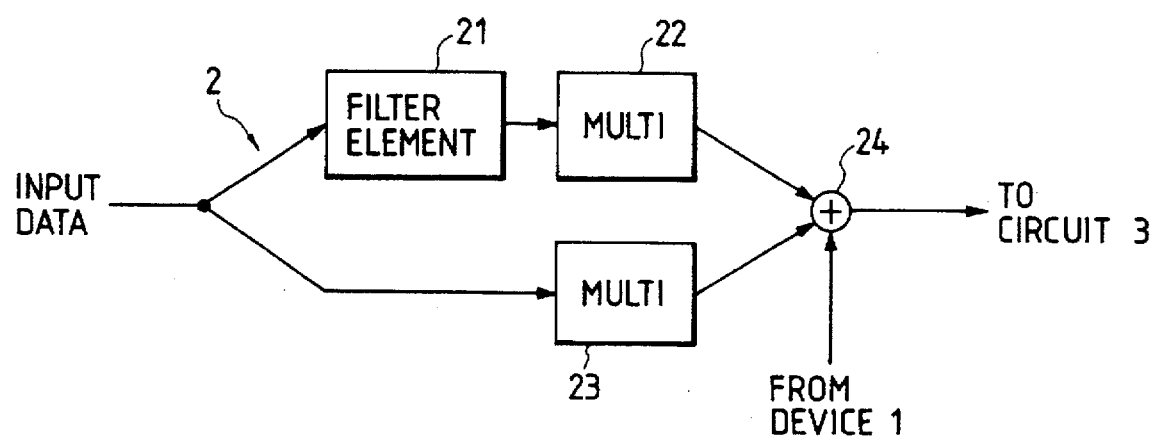
FIG. 6 is a block diagram of a prefilter in a data compression apparatus according to a second embodiment of this invention.
Figure 7:
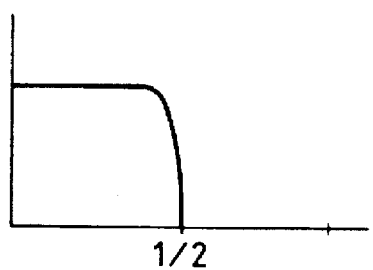
FIG. 7 is a diagram of a characteristic of the filter element in the prefilter of FIG. 6.

FIGS. 6 and 7 relate to a second embodiment of this invention which is similar to the embodiment of FIGS. 1–5 except for design changes indicated hereinafter. In the second embodiment, as shown in FIG. 6, a prefilter 2 includes a filter element 21, multipliers 22 and 23, and an adder 24.

As shown in FIG. 7, the filter element 21 has a predetermined band limiting characteristic which is defined by a band limiting factor (a cut-off frequency) of 1/2 with respect to a reference value. Image data inputted into the prefilter 2 are subjected to a band limiting process by the filter element 21. Output image data from the filter element 21 are fed to the multipliers 22 and 23.

The multiplier 22 multiplies the image data and a coefficient. The coefficient in the multiplier 22 is varied in accordance with the level represented by the image data. Specifically, the coefficient in the multiplier 22 is equal to 0/16, 1/16, 2/16, ..., 16/16 for levels of 0, 1, 2, ..., 16 respectively.

The multiplier 23 multiplies the image data and a coefficient. The coefficient in the multiplier 23 is varied in accordance with the level represented by the image data. Specifically, the coefficient in the multiplier 28 is equal to 16/16, 15/16, 14/16, ..., 0/16 for levels of 0, 1, 2, ..., 16 respectively.

Output data from the multipliers 22 and 23 are fed to the adder 24 and are added by the adder 24. Specifically, the adder 24 includes a weighting section which weights the output data from the multipliers 22 and 23 with weighting factors prior to the execution of the addition. The weighting factors are controlled by a band limiting value fed from a code-amount predictive device 1. Then, the weighted output data from the multipliers 22 and 23 are added. In this way, the ratio between the output data from the multipliers 22 and 23 is varied in accordance with the band limiting value before the execution of the addition, so that the filtering characteristic of the prefilter 2 is changed in response to the band limiting value. Output data from the adder 24 are fed to a DCT circuit 3 as output data from the prefilter 2.

DESCRIPTION OF THE THIRD PREFERRED EMBODIMENT

In general, input image data are of two types to be exposed to intra-frame data processing and inter-frame data processing respectively.

Figure 8:
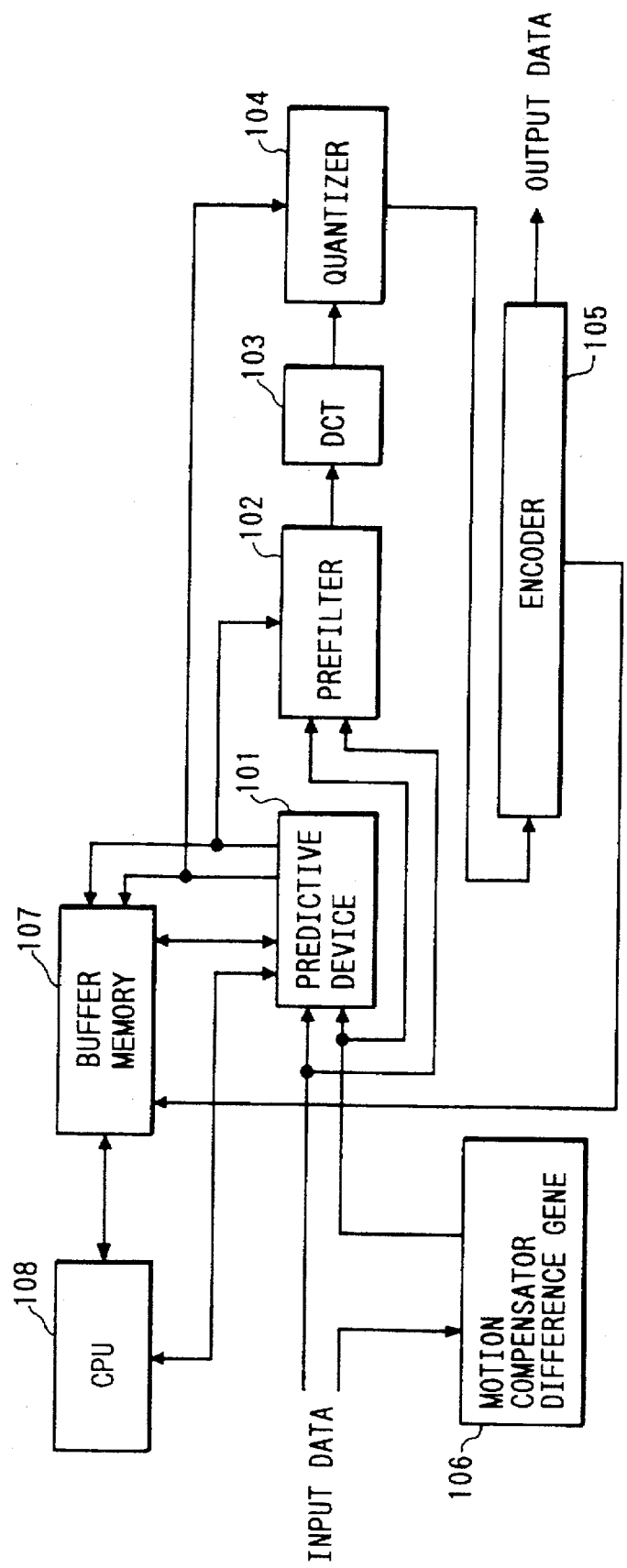
FIG. 8 is a block diagram of a data compression apparatus according to a third embodiment of this invention.

With reference to FIG. 8, input image data of the inter-frame type are fed to a code-amount predictive device 101 and a prefilter 102 via a device 106 composed of a motion compensator and a difference-data generator (an error-data generator). Input image data of the intra-frame type are directly fed to the code-amount predictive device 101 and the prefilter 102. The code-amount predictive device 101 predicts the amount of codes on the basis of the input image data, determines a band limiting value and a quantization step size in response to the predicted code amount, and outputs data of the determined band limiting value and the determined quantization step size to the prefilter 102 and a quantizer 104 respectively.

The device 106 subjects the input image data to a motion compensating process, and generates data representative of a difference (an error) between inter-frame predicted image data and reference image data. The difference data are outputted from the device 106 to the code-amount predictive device 101 and the prefilter 102 as image data.

The prefilter 102 limits the band of the image data in response to the band limiting value fed from the code-amount predictive device 101. Output image data from the prefilter 102 are fed to an orthogonal transform device 108 including a discrete cosine transform (DCT) circuit. The image data are subjected to DCT by the DCT circuit 108. Output image data from the DCT circuit 103 are fed to the quantizer 104. The quantizer 104 quantizes the image data with the quantization step size fed from the code-amount predictive device 101. Output image data from the quantizer 104 are fed to an encoder 105 and are converted by the encoder 105 into corresponding code words of a given-format code such as a zero run length code, a Huffman code, or both the zero run length code and the Huffman code. The output coded data (the output code words) from the encoder 105 are transmitted, or recorded into a recording medium (not shown) via a suitable device (not shown).

A buffer memory 107 is connected to the code-amount predictive device 101 and the encoder 105. The buffer memory 107 stores output data from the code-amount predictive device 101 and the encoder 105. The buffer memory 107 feeds necessary data to the code-amount predictive device 101. The code-amount predictive device 101 and the buffer memory 107 are connected to a CPU 108. The code-amount predictive device 101 and the buffer memory 107 are controlled by the CPU 108.

Figure 9:
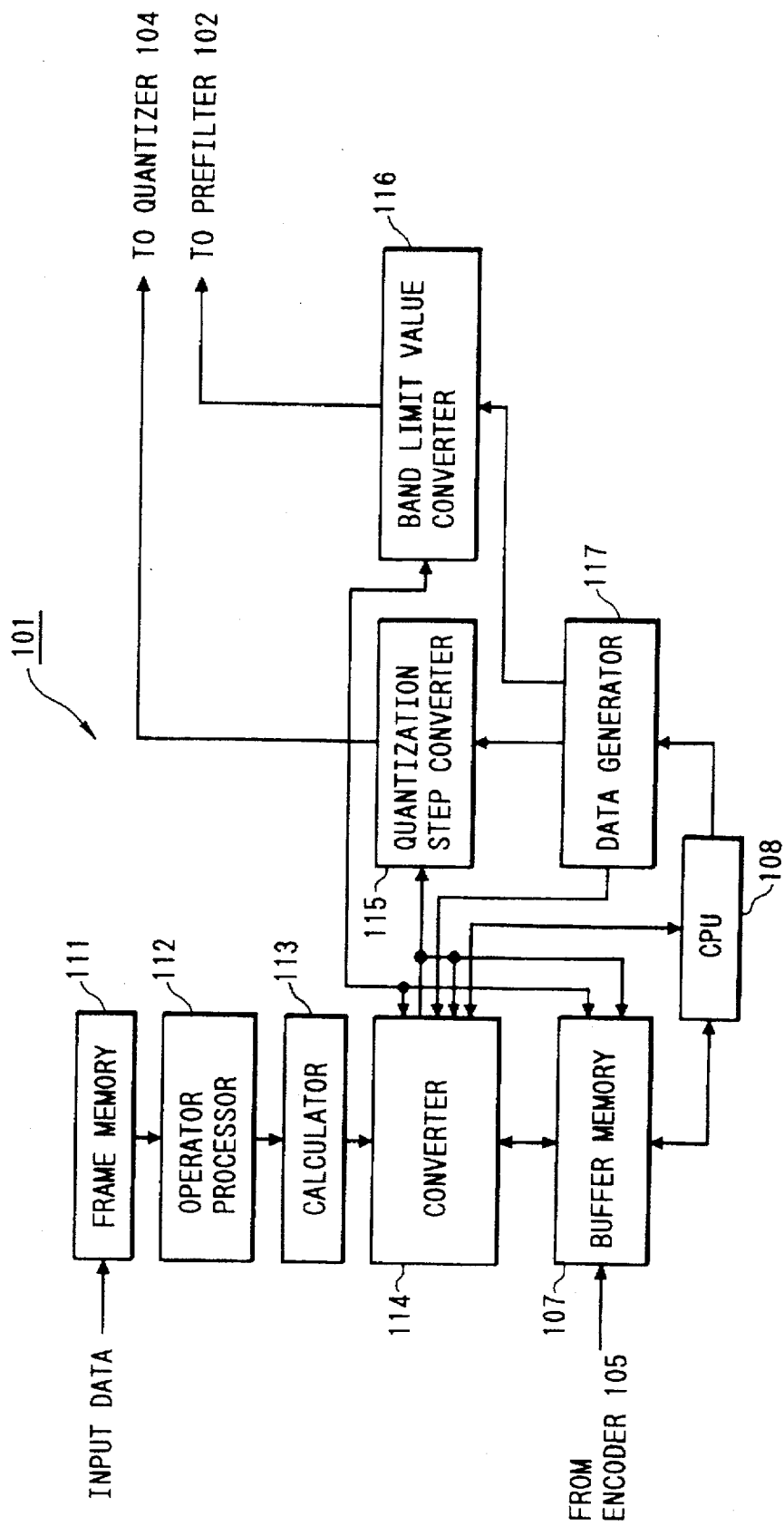
FIG. 9 is a block diagram of the code-amount predictive device of FIG. 8.

As shown in FIG. 9, the code-amount predictive device 101 includes a frame memory 111 into which the input image data are temporarily stored. The image data are read out from the frame memory 111 and are then fed to an operator processor 112. The image data are subjected to a predetermined filtering process by the operator processor 112. Output image data from the operator processor 112 are fed to a calculator 113. The calculator 113 calculates the absolute values of the image data and sums the absolute values to obtain an activity value. Output image data from the calculator 113 which represent the activity value are fed to a code-amount converter 114. The code-amount converter 114 converts the activity value into a predicted code amount which will be obtained at a standard quantization step size and a standard band limiting value. Data representing the predicted code amount are outputted from the code-amount converter 114 to a quantization step converter 115 and a band limiting value converter 116.

A data generator 117 is controlled by the CPU 108 to output data representing a target code amount (a target code-word bit number). The output data from the data generator 117 are fed to the quantization step converter 115 and the band limiting value converter 116. The quantization step converter 115 compares the predicted code amount and the target code amount, and determines a quantization step size in response to the error between the predicted code amount and the target code amount. Data representing the determined quantization step size are outputted from the quantization step converter 115 to the quantizer 104. The band limiting value converter 116 compares the predicted code amount and the target code amount, and determines a band limiting value in response the error between the predicted code amount and the target code amount. Data representing the determined band limiting value are outputted from the band limiting value converter 116 to the prefilter 102.

The code-amount predictive device 101 will be further described. The input image data corresponding to one frame are temporarily stored into the frame memory 111. The image data are read out from the frame memory 111 and are then fed to the operator processor 112. The image data are subjected to the predetermined filtering process by the operator processor 112.

Specifically, the predetermined filtering process executed by the operator processor 112 is selected from a high-pass filtering process, a low-pass filtering process, and a Laplacian filtering process. The high-pass filtering process, the low-pass filtering process, and the Laplacian filtering process are performed by using matrixes of 3×3 coefficients shown in FIG. 3(a), FIG. 3(b), and FIG. 3(c) respectively. During the filtering process executed by the operator processor 112, 3×3 pixel data composing a 3×3 pixel region of one frame are read out from the frame memory 111 and are then multiplied by the 3×3 coefficients respectively, and the 3×3 data which result from the multiplication are summed. As a result, the filtering process is completed for the data composing the 3×3 pixel region. Then, the data reading region is shifted rightward by one pixel for example, and 3×3 pixel data composing the shifted region are read out from the frame memory 111 and are subjected to similar multiplication and summing calculation. As a result, the filtering process is completed for the data composing the subsequent 3×3 pixel region. Such processes are reiterated to complete the filtering processing of all the data corresponding to one frame. It should be noted that the data reading region may be shifted by two pixels, three pixels, or a number of more than three pixels. The operator processor 112 outputs one piece of data representative of the result of summing calculation each time a filtering process for 3×3 pixel data is completed.

The calculator 113 receives the output data from the operator processor 112 which represent the results of summing calculation. The calculator 113 calculates the absolute values of the summing-calculation results, and adds the calculated absolute values corresponding to one frame. The result of the addition of the absolute values agrees with an activity value. As shown in FIG. 4, the result of the addition of the absolute values, that is, the activity value, is approximately proportional to the code amount. Specifically, with respect to a given result of the addition (a given activity value), the amount of codes of the image data lies in the hatched range of FIG. 4.

It should be noted that the calculator 113 may be modified as follows. A first modified calculator calculates the squares of the summing-calculation results, and adds the calculated squares. A second modified calculator 113 calculates the squares of the summing-calculation results, and adds the calculated squares and calculates an average of the result of the addition.

The code-amount converter 114 receives the output data from the calculator 113 which represent the activity value or the result of the addition executed by the calculator 113. The code-amount converter 114 includes a ROM storing data representative of a predicted code amount which varies as a function of an addition result. Specifically, the predicted code amount is equal to an average value of a code amount. The average value of the code amount is predetermined so as to correspond to the solid line in FIG. 4 which agrees with the center of the hatched range of FIG. 4. The code-amount converter 114 determines a predicted code amount in response to the addition result (the activity value) by referring to the data stored in the ROM. The output data from the code-amount converter 114 which represents the predicted code amount are fed to the quantization step converter 115 and the band limiting value converter 116.

The code-amount converter 114 will be further described. The amounts of code words are previously calculated which are generated when image data representing various picture patterns are limited in band with a standard band limiting value (A=0) and are quantized with a standard quantization step size (F=50). The code-amount converter 114 stores such previously-calculated code amounts as data designed such that an activity value and a code amount correspond to each other in a one-to-one manner.

During the encoding of image data of the first frame or the first field for which any previous data are absent, the code-amount converter 114 executes the following calculation.

$$BID(50,0) = ACT \times k$$

where BID(50,0) denotes a predicted code amount with respect to the standard quantization step size (F=50) and the standard band limiting value (A=0), and ACT denotes an activity value and "k" denotes a predetermined constant. In other words, the code-amount converter 114 calculates the predicted code amount BID(50,0) by multiplying the constant "k" and the activity value ACT outputted from the calculator 113.

During the encoding of image data of the second and later frames and fields, the code-amount converter 114 executes the following calculation.

$$BID(50.0) = ACT \times (BID^{-1}(F,A)/TGT) \times (BID^{-1}(50,0)/ACT^{-1})$$

where $BID^{-1}(50,0)$ denotes a preceding predicted code amount with respect to the standard quantization step size (F=50) and the standard band limiting value (A=0); $BID^{-1}(F,A)$ denotes a preceding actual code amount with respect to a preceding quantization step size (F) and a preceding band limiting value (A); $ACT^{-1}$ denotes a preceding activity value; and TGT denotes a target code amount. Data representing the preceding predicted code amount $BID^{-1}(50,0)$, data representing the preceding activity value $ACT^{-1}$, and data representing the preceding actual code amount $BID^{-1}(F,A)$ are fed to the code-amount converter 114 from the buffer memory 107. For this purpose, when the predicted code amount BID(50,0) is calculated, the code-amount converter 114 stores data of the predicted code amount BID(50,0) and the current activity value ACT into the buffer memory 107 for later use in a next operation cycle as a preceding predicted code amount $BID^{-1}(50,0)$ and a preceding activity value $ACT^{-1}$, respectively. Furthermore, the encoder 105 stores data of a current actual code amount BID(F,A) into the buffer memory 107 for later use in a next operation cycle as a preceding actual code amount $BID^{-1}(F,A)$. Data representing the target code amount TGT are fed to the code-amount converter 114 from the data generator 117.

In the previously-mentioned equation, the term "$BID^{-1}(F,A)/TGT$" is a feedback part for decreasing an error between an actual code amount and the target code amount while the term "$BID^{-1}(50,0)/ACT^{-1}$" is a feedback part which is introduced on the basis of a close correlation between a preceding operation cycle and a current operation cycle and which includes the preceding inclination within the hatched range of FIG. 4.

The data generator 117 includes a ROM storing data representing a target code amount (a target code-word bit number). The output data from the data generator 117 which represent the target code amount are fed to the the quantization step converter 115 and the band limiting value converter 116.

The data generator 117 is similar in internal structure to the data generator 17 of FIG. 2 except for the following points. While the data generator 17 of FIG. 2 is controlled by the frame clock signal, the data generator 117 is controlled by the output signal from the CPU 108 which corresponds to a frame clock signal.

The quantization step converter 115 includes a comparator or a subtracter which compares the predicted code amount and the target code amount to calculate the error between the predicted code amount and the target code amount. The quantization step converter 115 also includes a ROM storing data representative of a desired quantization step size which varies as a function of an error between a predicted code amount and a target code amount. The desired quantization step size is chosen so that an actual code amount can be equal to the target code amount. The quantization step converter 115 determines the desired quantization step size in response to the error between the predicted code amount and the target code amount by referring to the data stored in the ROM. The output data from the quantization step converter 115 which represent the desired quantization step size are fed to the quantizer 104. The quantization step converter 115 is similar in internal design to the quantization step converter 15 of FIG. 2.

The band limiting value converter 116 includes a comparator or a subtracter which compares the predicted code amount and the target code amount to calculate the error between the predicted code amount and the target code amount. The band limiting converter 116 also includes a ROM storing data representative of a desired band limiting value which varies as a function of an error between a predicted code amount and a target code amount. The desired band limiting value is chosen so that an actual code amount can be equal to the target code amount. The band limiting value converter 116 determines the desired band limiting value in response to the error between the predicted code amount and the target code amount by referring to the data stored in the ROM. The output data from the band limiting value converter 116 which represent the desired band limiting value are fed to the prefilter 102. The band limiting value converter 116 is similar in internal structure to the band limiting value converter 16 of FIG. 2.

The prefilter 102, the DCT circuit 103, the quantizer 104, and the encoder 105 will be further described. The prefilter 102 has a band limiting characteristic variable among 16 different types, some of which are shown in the parts (a)–(g) of FIG. 5. The 16 types are defined by band limiting factors (cut-off frequencies) of 15/16–1/16 with respect to a reference value respectively. The band limiting characteristic of the prefilter 102 is selected from the 16 different types in response to the desired band limiting value fed from the band limiting value converter 116. The input image data are processed by the prefilter 102 with the selected band limiting characteristic. The band-limited output data from the prefilter 102 are fed to the DCT circuit 103.

The DCT circuit 103 separates one-frame output image data from the prefilter 102 into blocks. The image data are subjected by the DCT circuit 103 to DCT for each of the blocks. Output data from the DCT circuit 103 are fed to the quantizer 104. The quantizer 104 quantizes the image data with the quantization step size fed from the code-amount predictive device 101. Output image data from the quantizer 104 are fed to the encoder 105 and are converted by the encoder 105 into corresponding words of a given-format code such as a zero run length code, a Huffman code, or both the zero run length code and the Huffman code. The output coded data (the output code words) from the encoder 105 are transmitted, or recorded into a recording medium (not shown) via a suitable device (not shown).

Frames represented by image data are of two types subjected to intra-frame data processing and inter-frame data processing respectively, and the frames of the two types will be referred to as intra-frames and inter-frames respectively. A switch or switches (not shown) are provided for selecting one of intra-frame processing and inter-frame processing with respect to the input image data. The CPU 108 controls the selection switches to selectively subject successive frames to intra-frame data processing and inter-frame data processing in a predetermined sequence. In other words, the CPU 108 makes successive frames into intra-frames and inter-frames in a predetermined sequence.

FIG. 10 shows an example of the frame arrangement realized by the operation of the CPU 108. As shown in FIG. 10, four successive frames are grouped into a segment. The first, second, and third frames in a segment are inter-frames while the fourth frame in a segment is an intra-frame.

Figure 11:
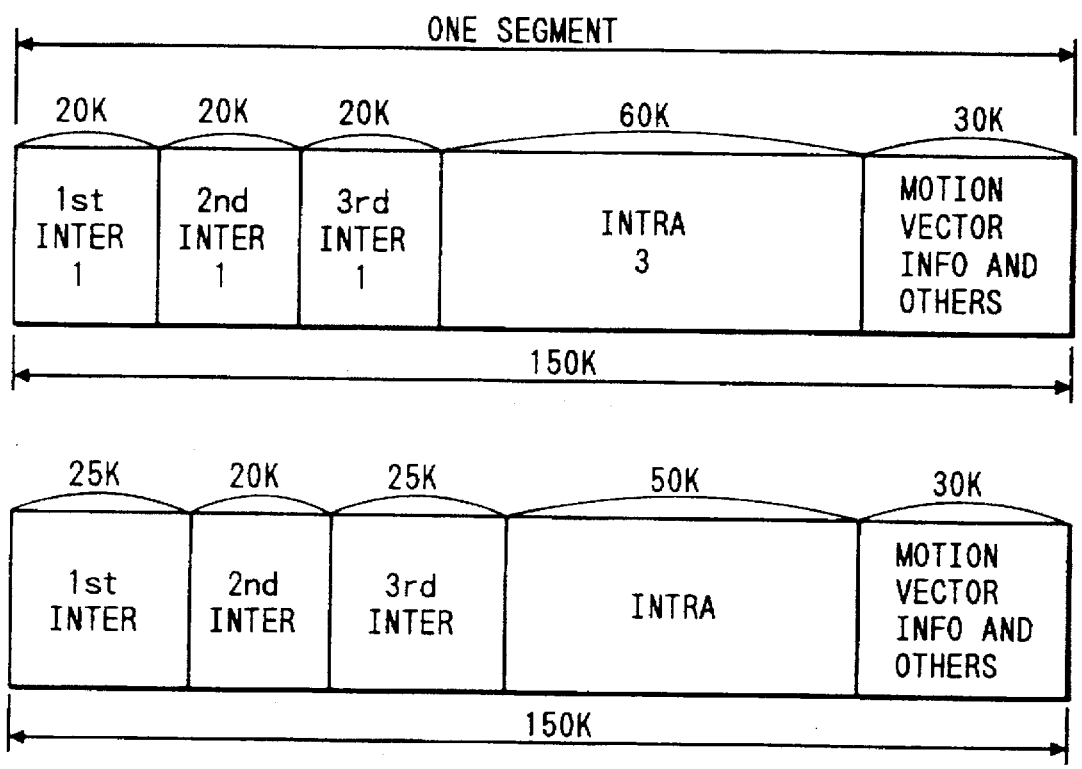
FIG. 11 is a diagram of target code amounts and actual code amounts in the data compression apparatus of FIG. 8.

As shown in FIG. 11, a segment has normal image information in the first frame to the fourth frame and also added information such as motion-vector information. A description will be given of an example where, as shown in the upper part of FIG. 11, a target total amount of codes in a current segment (a target total number of bits in a current segment) is 150 Kbits. It is now assumed that the amount of code words of added information such as motion-vector information in a preceding frame is 30 Kbits. The CPU 108 estimates the amount of code words of added information in the current frame as being equal to the amount of code words of added information in the preceding frame. Thus, the CPU 108 subtracts 30 Kbits from 150 Kbits and allot the remaining 120 Kbits to normal image data in the first frame to the fourth frame of the current segment.

The CPU 108 calculates the ratio among the activity values of the first frame to the fourth frame which are outputted from the calculator 118. When the ratio is "1:1:1:3" for example, the CPU 108 allots 20 Kbits, 20 Kbits, 20 Kbits, and 60 Kbits to the first frame, the second frame, the third frame, and the fourth frame as target code amounts respectively. Data representing these target code amounts are outputted from the CPU 108 to the data generator 117. As a result, the image data in each of the first frame to the third frame are encoded with a target code amount of 20 Kbits.

In general, the target code amount in the fourth frame is modified as follows. The CPU 108 monitors the actual code amount by referring to the output signal from the encoder 105 via the buffer memory 107. The CPU 108 accumulates the errors between the target code amounts and the actual code amounts in the first frame to the third frame, and corrects the target code amount in the fourth frame in response to the result of the accumulation of the errors. For example, when the actual code amounts in the first frame, the second frame, and the third frame are 25 Kbits, 20 Kbits, and 25 Kbits respectively as shown in the lower part of FIG. 11, that is, when the error between the target code amounts and the actual code amounts in the first frame, the second frame, and the third frame are 5 Kbits, 20 Kbits, and 5 Kbits respectively, the CPU 108 corrects the target code amount in the fourth frame into 50 Kbits.

Figure 12:
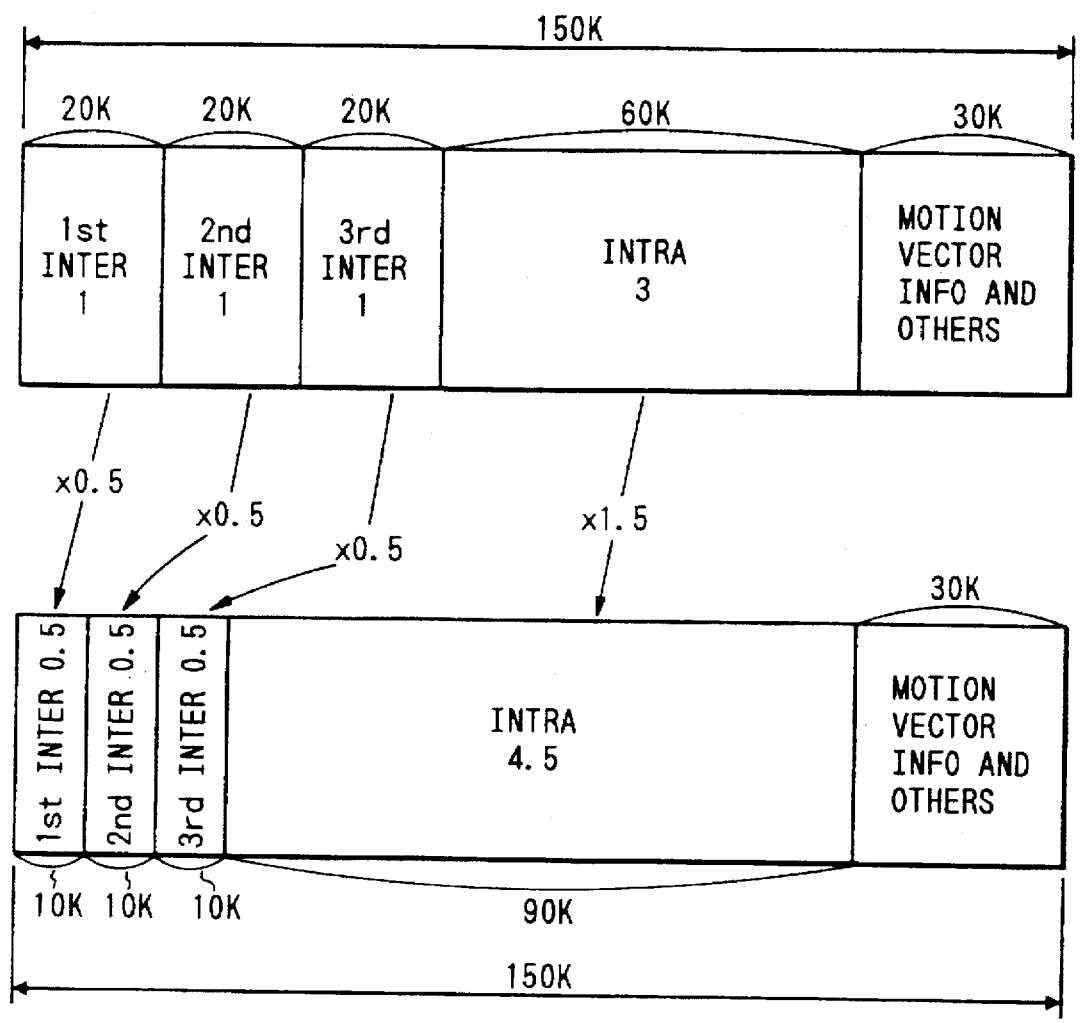
FIG. 12 is a diagram of target code amounts and actual code amounts in the data compression apparatus of FIG. 8.
Figure 13:
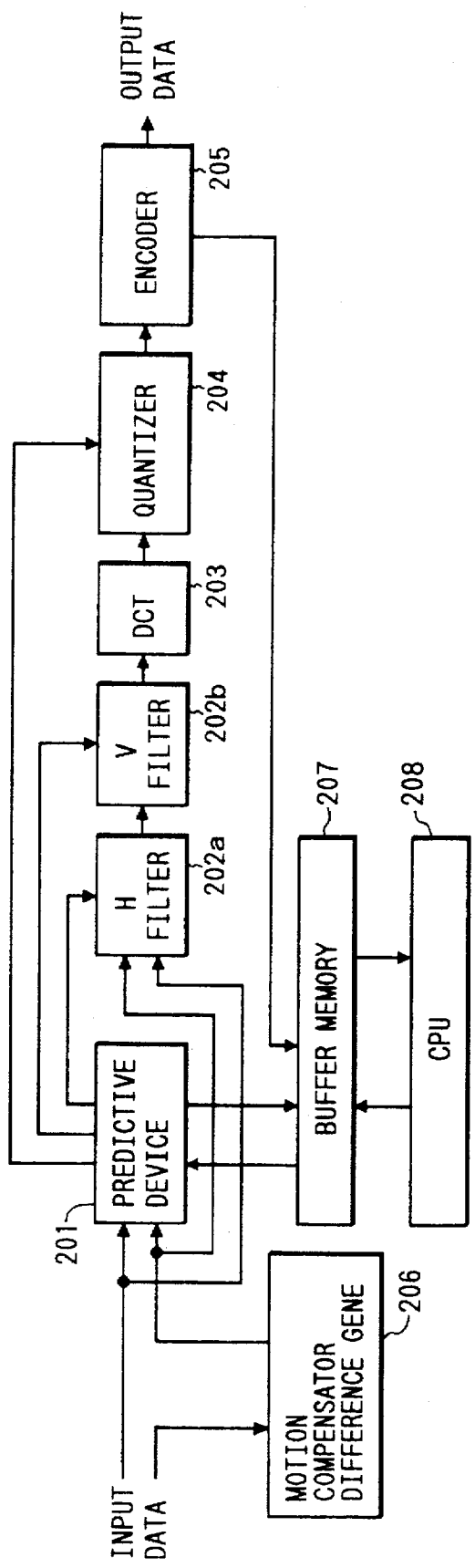
FIG. 13 is a block diagram of a data compression apparatus according to a fifth embodiment of this invention.

As shown in FIG. 12, the target code amounts in the first frame to the fourth frame may be modified by a process of weighting the ratio among the activity values of the first frame to the fourth frame. When the ratio is "1:1:1:8" for example, the CPU 108 multiplies the target code amounts in the first frame, the second frame, the third frame, and the fourth frame by factors of 0.5, 0.5, 0.5, and 1.5 to modify the target code amounts respectively. The resulting modified target code amounts in the first frame, the second frame, the third frame, and the fourth frame are 10 Kbits, 10 Kbits, 10 Kbits, and 90 Kbits respectively.

DESCRIPTION OF THE FOURTH PREFERRED EMBODIMENT

A fourth embodiment of this invention is similar to the embodiment of FIGS. 8–11 except that a prefilter 102 is designed in agreement with the prefilter 2 of the embodiment of FIGS. 6 and 7.

DESCRIPTION OF THE FIFTH PREFERRED EMBODIMENT

In general, input image data are of two types to be exposed to intra-frame data processing and inter-frame data processing respectively.

Figure 18:
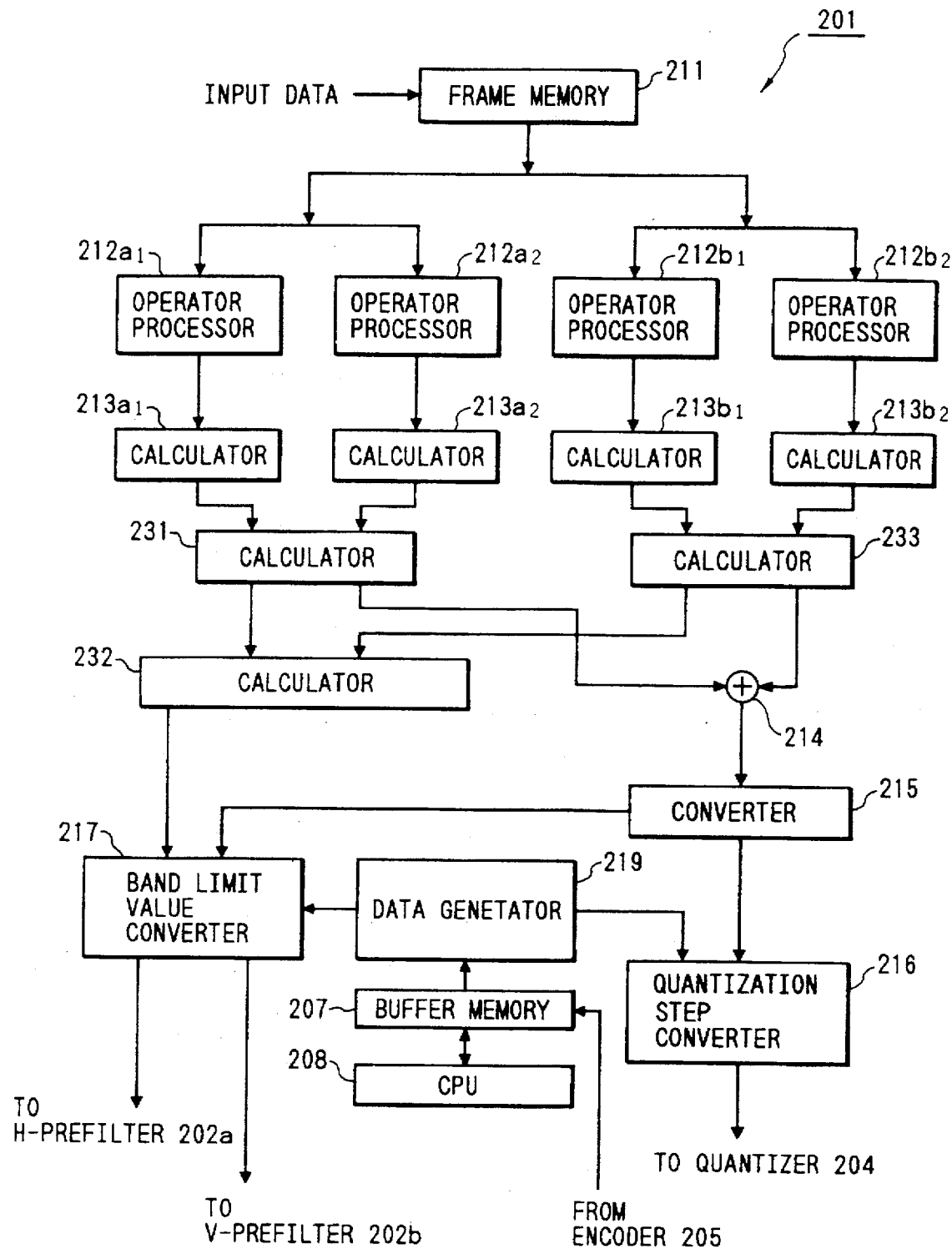
FIG. 18 is a block diagram of a code-amount predictive device in a data compression apparatus according to a seventh embodiment of this invention.

With reference to FIG. 18, input image data of the inter-frame type are fed to a code-amount predictive device 201 and a horizontal-direction prefilter 202a via a device 208 composed of a motion compensator and a difference-data generator (an error-data generator). Input image data of the intra-frame type are directly fed to the code-amount predictive device 201 and the horizontal-direction prefilter 202a. The code-amount predictive device 201 predicts the amount of codes on the basis of the input image data, and determines a horizontal-direction band limiting value, a vertical-direction band limiting value, and a quantization step size in response to the predicted code amount and outputs data of the determined horizontal-direction band limiting value, the determined vertical-direction band limiting value, and the determined quantization step size to the horizontal-direction prefilter 202a, a vertical-direction prefilter 202b, and a quantizer 204 respectively.

The device 206 subjects the input image data to a motion compensating process, and generates data representative of a difference (an error) between inter-frame predicted image data and reference image data. The difference data are outputted from the device 106 to the code-amount predictive device 201 and the horizontal-direction prefilter 202a as image data.

The horizontal-direction prefilter 202a limits the horizontal-direction band of the image data in response to the horizontal-direction band limiting value fed from the code-amount predictive device 201. Output image data from the horizontal-direction prefilter 202a are fed to the vertical-direction prefilter 202b. The vertical-direction prefilter 202b limits the vertical-direction band of the image data in response to the vertical-direction band limiting value fed from the code-amount predictive device 201. Output image data from the vertical-direction prefilter 202b are fed to an orthogonal transform device 203 including a discrete cosine transform (DCT) circuit. The image data are subjected to DCT by the DCT circuit 203. Output image data from the DCT circuit 203 are fed to the quantizer 204. The quantizer 204 quantizes the image data with the quantization step size fed from the code-amount predictive device 201. Output image data from the quantizer 204 are fed to an encoder 205 and are converted by the encoder 205 into corresponding words of a given-format code such as a zero run length code, a Huffman code, or both the zero run length code and the Huffman code. The output coded data (the output code words) from the encoder 205 are transmitted, or recorded into a recording medium (not shown) via a suitable device (not shown).

A buffer memory 207 is connected to the code-amount predictive device 201 and the encoder 205. The buffer memory 207 stores output data from the code-amount predictive device 201 and the encoder 205. The buffer memory 207 feeds necessary data to the code-amount predictive device 201 to execute a feedback process. The code-amount predictive device 201 and the buffer memory 207 are connected to a CPU 208. The code-amount predictive device 201 and the buffer memory 207 are controlled by the CPU 208.

Figure 14:
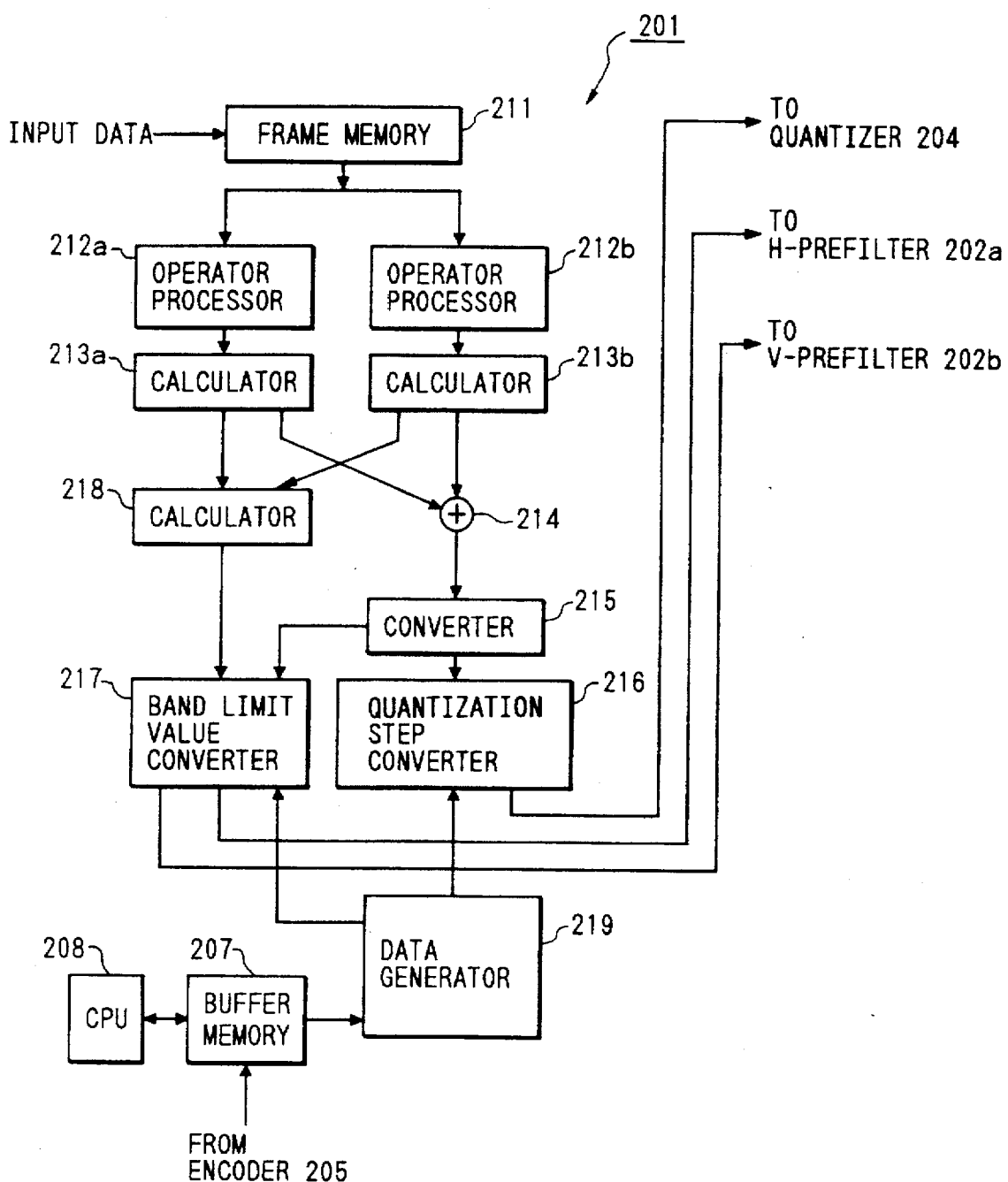
FIG. 14 is a block diagram of the code-amount predictive device of FIG. 13.

As shown in FIG. 14, the code-amount predictive device 201 includes a frame memory 211 into which the input image data are temporarily stored. The image data are read out from the frame memory 211 and are then fed to a horizontal-direction operator processor 212a and a vertical-direction operator processor 212b. The image data are subjected to a predetermined filtering process by the horizontal-direction operator processor 212a. At the same time, the image data are subjected to a predetermined filtering process by the vertical-direction operator processor 212b. Output image data from the horizontal-direction operator processor 212a are fed to a calculator 213a. The calculator 213a calculates the absolute values of the image data and sums the absolute values. Output image data from the calculator 213a are fed to an adder 214 and a calculator 213. Output image data from the vertical-direction operator processor 212b are fed to a calculator 213b. The calculator 213b calculates the absolute values of the image data and sums the absolute values. Output image data from the calculator 213b are fed to the adder 214 and the calculator 218.

The adder 214 adds the output image data from the calculators 218a and 218b. Output image data from the adder 214 are fed to a code-amount converter 215. The code-amount converter 215 converts the output image data of the adder 214 into a predicted code amount which will be obtained at a standard quantization step size and a standard band limiting value. Data representing the predicted code amount are outputted from the code-amount converter 215 to a quantization step converter 216 and a band limiting value converter 217.

The calculator 218 calculates the ratio between the output image data from the calculators 213a and 213b. Output image data from the calculator 218 which represent the calculated ratio are fed to the band limiting value converter 217.

A data generator 219 is controlled by the CPU 208 to output data representing a target code amount. The output data from the data generator 219 are fed to the quantization step converter 216 and the band limiting value converter 217. The quantization step converter 216 compares the predicted code amount and the target code amount, and determines a quantization step size in response to the error between the predicted code amount and the target code amount. Data representing the determined quantization step size are outputted from the quantization step converter 216 to the quantizer 204. The band limiting value converter 217 compares the predicted code amount and the target code amount, and determines a horizontal-direction band limiting value and a vertical-direction band limiting value in response to the error between the predicted code amount and the target code amount and the ratio data fed from the calculator 218, which will be described later in detail. Data representing the determined horizontal-direction band limiting value are outputted from the band limiting value converter 217 to the horizontal-direction prefilter 202a. Data representing the determined vertical-direction band limiting value are outputted from the band limiting value converter 217 to the vertical-direction prefilter 202b.

The code-amount predictive device 201 will be further described. The input image data corresponding to one frame are temporarily stored into the frame memory 211. The image data are read out from the frame memory 211 and are then fed to the horizontal-direction operator processor 212a and the vertical-direction operator processor 212b. The image data are subjected to the predetermined filtering process by the horizontal-direction operator processor 212a. At the same time, the image data are subjected to the predetermined filtering process by the vertical-direction operator processor 212b.

Figure 15A:
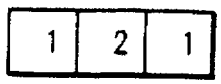
FIG. 15(a) is a diagram of a first matrix of filtering coefficients used in the code-amount predictive device of FIG. 14.
Figure 15B:
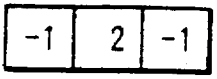
FIG. 15(b) is a diagram of a second matrix of filtering coefficients used in the code-amount predictive device of FIG. 14.

Specifically, the predetermined filtering process executed by the horizontal-direction operator processor 212a is selected from a low-pass filtering process and a high-pass filtering process. The low-pass filtering process and the high-pass filtering process are performed by using matrixes (vectors) of 1×3 coefficients shown in FIG. 15(a) and FIG. 15(b) respectively. During the filtering process executed by the horizontal-direction operator processor 212a, 1×3 pixel data composing a 1×3 pixel region of one frame are read out from the frame memory 211 and are then multiplied by the 1×3 coefficients respectively, and the 1×3 data which result from the multiplication are summed. As a result, the filtering process is completed for the data composing the 1×3 pixel region. Then, the data reading region is shifted rightward by one pixel for example, and 1×3 pixel data composing the shifted region are read out from the frame memory 211 and are subjected to similar multiplication and summing calculation. As a result, the filtering process is completed for the data composing the subsequent 1×3 pixel region. Such processes are reiterated to complete the filtering processing of all the data corresponding to one frame. It should be noted that the data reading region may be shifted by two pixels, three pixels, or a number of more than three pixels. The horizontal-direction operator processor 212a outputs one data representative of the result of summing calculation each time a filtering process for 1×3 pixel data is completed.

Figure 16A:
FIG. 16(a) is a diagram of a first matrix of filtering coefficients used in the code-amount predictive device of FIG. 14.
Figure 16B:
FIG. 16(b) is a diagram of a second matrix of filtering coefficients used in the code-amount predictive device of FIG. 14.

The predetermined filtering process executed by the vertical-direction operator processor 212b is selected from a low-pass filtering process and a high-pass filtering process. The low-pass filtering process and the high-pass filtering process are performed by using matrixes (vectors) of 3×1 coefficients shown in FIG. 16(a) and FIG. 16(b) respectively. During the filtering process executed by the vertical-direction operator processor 212b, 3×1 pixel data composing a 3×1 pixel region of one frame are read out from the frame memory 211 and are then multiplied by the 3×1 coefficients respectively, and the 3×1 data which result from the multiplication are summed. As a result, the filtering process is completed for the data composing the 3×1 pixel region. Then, the data reading region is shifted rightward by one pixel for example, and 3×1 pixel data composing the shifted region are read out from the frame memory 211 and are subjected to similar multiplication and summing calculation. As a result, the filtering process is completed for the data composing the subsequent 3×1 pixel region. Such processes are reiterated to complete the filtering processing of all the data corresponding to one frame. It should be noted that the data reading region may be shifted by two pixels, three pixels, or a number of more Than three pixels. The vertical-direction operator processor 212b outputs one data representative of the result of summing calculation each time a filtering process for 3×1 pixel data is completed.

The calculator 213a receives the output data from the horizontal-direction operator processor 212a which represent the results of summing calculation. The calculator 213a calculates the absolute values of the summing-calculation results, and adds the calculated absolute values corresponding to one frame. The output data from the calculator 213a which represent the addition result are fed to the adder 214.

The calculator 213b receives the output data from the vertical-direction operator processor 212b which represent the results of summing calculation. The calculator 213b calculates the absolute values of the summing-calculation results, and adds the calculated absolute values corresponding to one frame. The output data from the calculator 213b which represent the addition result are fed to the adder 214.

It should be noted that the calculator 213a and 213b may be modified as follows. A first modified calculator 213a or 213b calculates the squares of the summing-calculation results, and adds the calculated squares. A second modified calculator 213a or 213b calculates the squares of the summing-calculation results, and adds the calculated squares and calculates an average of the result of the addition.

The output data From the calculators 213a and 213b are added by the adder 214. As shown in FIG. 4, the result of the addition executed by the adder 214 is approximately proportional to the code amount. Specifically, with respect to a given result of the addition, the amount of codes of the image data lies in the hatched range of FIG. 4.

The code-amount converter 215 receives the output data from the adder 214. The code-amount converter 215 includes a ROM storing data representative of a predicted code amount which varies as a function of an addition result. Specifically, the predicted code amount is equal to an average value of a code amount. The average value of the code amount is predetermined so as to correspond to the solid line in FIG. 4 which agrees with the center of the hatched range of FIG. 4. The code-amount converter 215 determines a predicted code amount in response to the addition result by referring to the data stored in the ROM. The output data from the code-amount converter 215 which represents the predicted code amount are fed to the quantization step converter 216 and the band limiting value converter 217.

The code-amount converter 215 will be further described. The amounts of codes are previously calculated which are generated when image data representing various picture patterns are limited in band with a standard horizontal-direction band limiting value and a standard vertical-direction band limiting value and are quantized with a standard quantization step size. The code-amount converter 215 stores such previously-calculated code amounts as data designed such that an addition result and a code amount correspond to each other in a one-to-one manner.

The data generator 219 includes a ROM storing data representing a target code amount. The output data from the data generator 219 which represent the target code amount are fed to the the quantization step converter 216 and the band limiting value converter 217.

The quantization step converter 216 includes a comparator or a subtracter which compares the predicted code amount and the target code amount to calculate the error between the predicted code amount and the target code amount. The quantization step converter 216 also includes a ROM storing data representative of a desired quantization step size which varies as a function of an error between a predicted code amount and a target code amount. The desired quantization step size is chosen so that an actual code amount can be equal to the target code amount. The quantization step converter 216 determines the desired quantization step size in response to the error between the predicted code amount and the target code amount by referring to the data stored in the ROM. The output data from the quantization step converter 216 which represent the desired quantization step size are fed to the quantizer 204.

The band limiting value converter 217 includes a comparator or a subtracter which compares the predicted code amount and the target code amount to calculate the error between the predicted code amount and the target code amount. The band limiting converter 217 also includes a ROM storing data representative of a desired horizontal-direction band limiting value and a desired vertical-direction band limiting value which vary as functions of an error between a predicted code amount and a target code amount. The desired horizontal-direction band limiting value and the desired vertical-direction band limiting value are chosen so that an actual code amount can be equal to the target code amount. The band limiting value converter 217 determines the desired horizontal-direction band limiting value and the desired vertical-direction band limiting value in response to the error between the predicted code amount and the target code amount by referring to the data stored in the ROM. The output data from the band limiting value converter 217 which represent the desired horizontal-direction band limiting value are fed to the horizontal-direction prefilter 202a. The output data from the band limiting value converter 217 which represent the desired vertical-direction band limiting value are fed to the vertical-direction prefilter 202b.

The horizontal-direction prefilter 202a, the vertical-direction prefilter 202b, the DCT circuit 203, the quantizer 204, and the encoder 205 will be further described. Each of the horizontal-direction prefilter 202a and the vertical-direction prefilter 202b has a band limiting characteristic variable among 16 different types, some of which are shown in the pares (a)-(g) of FIG. 5. The 16 types are defined by band limiting factors (cut-off frequencies) of 15/16–1/16 with respect to a reference value respectively. The band limiting characteristic of the horizontal-direction prefilter 202a is selected from the 16 different types in response to the desired horizontal-direction band limiting value fed from the band limiting value converter 217. The band limiting characteristic of the vertical-direction prefilter 202b is selected from the 16 different types in response to the desired vertical-direction band limiting value fed from the band limiting value converter 217. The input image data are processed by the horizontal-direction prefilter 202a with the selected band limiting characteristic. The band-limited output data from the horizontal-direction prefilter 202a are fed to the vertical-direction prefilter 202b. The output data from the horizontal-direction prefilter 202a are processed by the vertical-direction prefilter 202b with the selected band limiting characteristic. The band-limited output data from the vertical-direction prefilter 202b are fed to the DCT circuit 203.

The relation between the horizontal-direction band limiting value and the vertical-direction band limiting value will be described. By use of a statistical method, the rate of a reduction in the code amount is previously calculated with every combination of varying horizontal-direction and vertical-direction band limiting values. FIG. 17 shows in part the previously-calculated rate of a reduction in the code amount with every combination of horizontal-direction and vertical-direction band limiting values. In FIG. 17, the previously-calculated rate is expressed in unit of percent. For example, the 25% code-amount reduction can be realized by 17 different combinations of horizontal-direction and vertical-direction band limiting values. At first, the code-amount reduction rate is determined on the basis of the target code amount. Secondly, one of combinations of horizontal-direction and vertical-direction band limiting values which can realize the determined code-amount reduction rate is selected in response to the ratio data outputted from the calculator 218.

In preparation for the selection of one of combinations of horizontal-direction and vertical-direction band limiting values, the ratio in information amount between the horizontal direction and the vertical direction is estimated by using the ratio data fed from the calculator 218. By use of the result of this estimation, one of combinations of horizontal-direction and vertical-direction band limiting values is selected so that the band limiting value of the direction with a greater information amount will be set lower while the band limiting value of the direction with a smaller information amount will be set higher.

The characters HL and VL are now introduced to represent the horizontal-direction band limiting value and the vertical-direction band limiting value respectively. For example, the ratio between the horizontal-direction band limiting value HL and the vertical-direction band limiting value VL is determined according to the following relation.

$$HL:VL=V/(H+V):H/(H+V)$$

where H denotes the horizontal-direction absolute-value addition result represented by the output data from the calculator 218a, and V denotes the vertical-direction absolute-value addition result represented by the output data from the calculator 218b. In the case where weighting is executed between the horizontal direction and the vertical direction, the ratio between the horizontal-direction band limiting value HL and the vertical-direction band limiting value VL is determined according to the following relation.

$$HL:VL=\Delta V/(H+V):(1-\Delta)H/(H+V)$$

where "$\Delta$" denotes a predetermined constant between 0 and 1.

The DCT circuit 208 separates one-frame output image data from the vertical-direction prefilter 202b into blocks. The image data are subjected by the DCT circuit 203 to DCT for each of the blocks. Output data from the DCT circuit 208 are fed to the quantizer 204. The quantizer 204 quantizes the image data with the quantization step size fed from the code-amount predictive device 201. Output image data from the quantizer 204 are fed to the encoder 205 and are converted by the encoder 205 into corresponding words of a given-format code such as a zero run length code, a Huffman code, or both the zero run length code and the Huffman code. The output coded data (the output code words) from the encoder 205 are transmitted, or recorded into a recording medium (not shown) via a suitable device (not shown).

DESCRIPTION OF THE SIXTH PREFERRED EMBODIMENT

A sixth embodiment of this invention is similar to the embodiment of FIGS. 13–17 except that both a horizontal-direction prefilter 202a and a vertical-direction prefilter 202b are designed in agreement with the prefilter 2 of the embodiment of FIGS. 6 and 7.

DESCRIPTION OF THE SEVENTH PREFERRED EMBODIMENT

FIG. 18 shows a seventh embodiment of this invention which is similar to the embodiment of FIGS. 13–17 except for an internal design of a code-amount predictive device.

Figure 19:
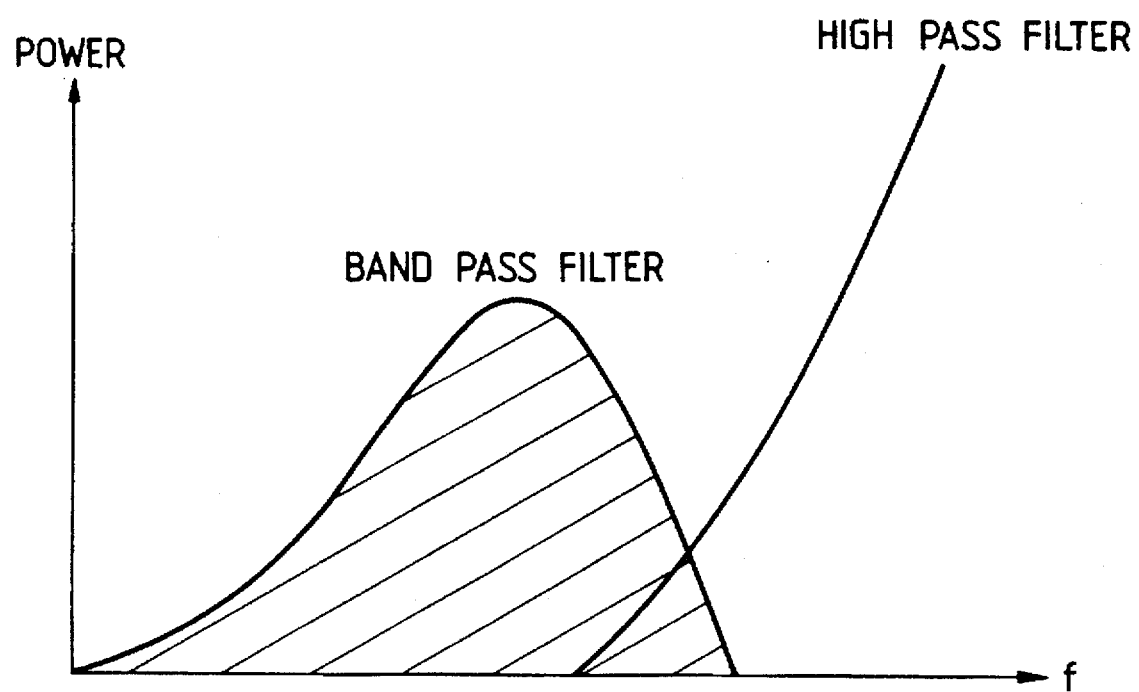
FIG. 19 is a diagram of characteristics of filtering processes executed in the code-amount predictive device of FIG. 18.

In the embodiment of FIG. 18, a code-amount predictive device 201 includes a frame memory 211 into which the input image data are temporarily stored. The image data are read out from the frame memory 211 and are then fed to horizontal-direction operator processors $212a_1$ and $212a_2$ and vertical-direction operator processors $212b_1$ and $212b_2$. The image data are subjected to predetermined filtering processes by these operator processors $212a_1$, $212a_2$, $212b_1$ and $212b_2$. The horizontal-direction operator processor $212a_1$, serves as a horizontal-direction band pass filter whose characteristic is shown in FIG. 19. The horizontal-direction operator processor $212a_2$ serves as a horizontal-direction high pass filter whose characteristic is shown in FIG. 19. The vertical-direction operator processor $212b_1$, serves as a vertical-direction band pass filter whose characteristic is shown in FIG. 19. The vertical-direction operator processor $212b_2$ serves as a vertical-direction high pass filter whose characteristic is shown in FIG. 19.

Output image data from the horizontal-direction operator processor $212a_1$ are fed to a calculator $218a_1$. The calculator $213a_1$ calculates the absolute values of the image data and sums the absolute values. Output image data from the calculator $213a_1$, are fed to a calculator 231. Output image data from the horizontal-direction operator processor $212a_2$ are fed to a calculator $213a_2$. The calculator $213a_2$ calculates the absolute values of the image data and sums the absolute values. Output image data from the calculator $213a_2$ are fed to the calculator 231. Output image data from the vertical-direction operator processor $212b_2$ are fed to a calculator $213b_1$. The calculator $213b_2$ calculates the absolute values of the image data and sums the absolute values. Output image data from the calculator $213b_1$ are fed to a calculator 233. Output image data from the vertical-direction operator processor $212b_2$ are fed to a calculator $213b_2$. The calculator $213b_2$ calculates the absolute values of the image data and sums the absolute values. Output image data from the calculator $213b_2$ are fed to the calculator 233.

The calculator 231 calculates a horizontal-direction activity value on the basis of the absolute-value addition results fed from the calculators $213a_1$ and $213a_2$. The calculator 233 calculates a vertical-direction activity value on the basis of the absolute-value addition results fed from the calculators $213b_1$ and $213b_2$. The horizontal-direction activity value or the vertical-direction activity value is determined in agreement with the absolute-value addition result M fed from the operator processor $212a_1$ or $212b_1$ which is corrected on the basis of the absolute-value addition result H fed from the operator processor $212a_2$ or $212b_2$ as follows.

$$M \rightarrow M \times 1.2 \text{ when } H > Hr$$

$$M \rightarrow M \text{ when } H \leq Hr$$

where Hr denotes a predetermined reference value. The horizontal-direction activity value is fed from the calculator 231 to an adder 214 and a calculator 232. The vertical-direction activity value is fed from the calculator 233 to the adder 214 and the calculator 232, The horizontal-direction activity value and the vertical-direction activity value are added by the adder 214. Output data from the adder 214 are fed to a code-amount converter 215. The code-amount converter 215 converts the output data of the adder 214 into a predicted code amount which will be obtained at a standard quantization step size and a standard band limiting value. Data representing the predicted code amount are outputted from the code-amount converter 215 to a quantization step converter 216 and a band limiting value converter 217.

The calculator 232 calculates the ratio between the horizontal-direction activity value and the vertical-direction activity value. Output data from the calculator 232 which represent the calculated ratio are fed to the band limiting value converter 217.

A data generator 219 is controlled by a CPU 208 to output data representing a target code amount. The output data from the data generator 219 are fed to the quantization step converter 216 and the band limiting value converter 217. The quantization step converter 216 compares the predicted code amount and the target code amount, and determines a quantization step size in response to the error between the predicted code amount and the target code amount. Data representing the determined quantization step size are outputted from the quantization step converter 216 to a quantizer 204. The band limiting value converter 217 compares the predicted code amount and the target code amount, and determines a horizontal-direction band limiting value and a vertical-direction band limiting value in response to the error between the predicted code amount and the target code amount and the calculated ratio data fed from the calculator 232. Data representing the determined horizontal-direction band limiting value are outputted from the band limiting value converter 217 to a horizontal-direction prefilter 202a. Data representing the determined vertical-direction band limiting value are outputted from the band limiting value converter 217 to a vertical-direction prefilter 202b.

What is claimed is:

1. A data compression apparatus comprising: first processing means for subjecting input image data included in a signal inputted to the apparatus to a predetermined horizontal-direction filtering process and outputting a first filtered signal including horizontally filtered data therein;

second processing means for subjecting the input image data to a predetermined vertical-direction filtering process and outputting a second filtered signal including vertically filtered data therein;

calculating means for executing a predetermined calculation on the horizontally filtered data and the vertically filtered data in the first and second filtered signals outputted from said first and second processing means, and outputting a signal including calculated data therein representative of the predetermined calculation, wherein the predetermined calculation includes at least an addition;

predicted-amount generating means for converting the calculated data in the signal outputted from the calculating means into a corresponding predicted code amount, and outputting a prediction signal including the predicted code amount therein;

setting means for setting a target code amount and generating a target signal representative thereof;

limit-value generating means for deriving a difference between the predicted code amount in the prediction signal and the target code amount represented by the target signal, and outputting a limiting signal including therein a horizontal-direction band limiting value and a vertical-direction band limiting value corresponding to the derived difference;

horizontal limiting means for limiting a horizontal-direction band of the input image data in accordance with the horizontal-direction band limiting value in the limiting signal outputted from the limit-value generating means; and vertical limiting means for limiting a vertical-direction band of the input image data in accordance with the vertical-direction band limiting value in the limiting signal outputted from the limit-value generating means.

2. A data compression apparatus comprising:

first processing means for subjecting input image data included in a signal inputted to the apparatus to a predetermined horizontal-direction filtering process having at least two different filtering characteristics, and outputting a first filtered signal including horizontally filtered data therein;

second processing means for subjecting the input image data to a predetermined vertical-direction filtering process having at least two different filtering characteristics, and outputting a second filtered signal including vertically filtered data therein;

first calculating means for calculating a horizontal-direction activity value from the horizontally filtered data in the first filtered signal outputted from the first processing means, and outputting a horizontal activity signal including the horizontal-direction activity value therein;

second calculating means for calculating a vertical-direction activity value from the vertically filtered data in the second filtered signal outputted from the second processing means, and outputting a vertical activity signal including the vertical-direction activity value therein;

adding means for adding the horizontal-direction activity value and the vertical-direction activity value respectively calculated by the first and second calculating means, and outputting a signal including addition data therein representing the added values;

means for converting the addition data in the signal outputted from the adding means into a corresponding predicted code amount, and outputting a prediction signal including the predicted code amount therein;

setting means for setting a target code amount and generating a target signal representative thereof;

limit-value generating means for deriving a difference between the predicted code amount in the prediction signal and the target code amount represented by the target signal, and outputting a limiting signal including therein a horizontal-direction band limiting value and a vertical-direction band limiting value corresponding to the derived difference;

horizontal limiting means for limiting a horizontal-direction band of the input image data in accordance with the horizontal-direction band limiting value in the limiting signal outputted from the limit-value generating means; and vertical limiting means for limiting a vertical-direction band of the input image data in accordance with the vertical-direction band limiting value in the limiting signal outputted from the limit-value generating means.

* * * * *

UNITED STATES PATENT AND TRADEMARK OFFICE
CERTIFICATE OF CORRECTION

PATENT NO. : 5,719,962
DATED : February 17, 1998
INVENTOR(S) : Takayuki Sugahara, et al.

It is certified that error appears in the above-identified patent and that said Letters Patent is hereby corrected as shown below:

On the title page, insert the followings:

[30] Foreign Application Priority Data
    Japan 2-50269 02/28/90
    Japan 2-71096 03/19/90
    Japan 2-71097 03/19/90--

Signed and Sealed this

Eighteenth Day of April, 2000

Attest:

Attesting Officer

Q. TODD DICKINSON

Director of Patents and Trademarks